United States Patent
Gao et al.

(10) Patent No.: US 11,356,220 B2
(45) Date of Patent: Jun. 7, 2022

(54) UPLINK TRANSMISSION METHOD, TERMINAL, AND BASE STATION

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 210 days.

(21) Appl. No.: 16/476,545

(22) PCT Filed: Feb. 2, 2018

(86) PCT No.: PCT/CN2018/075135
§ 371 (c)(1),
(2) Date: Jul. 8, 2019

(87) PCT Pub. No.: WO2018/127213
PCT Pub. Date: Jul. 12, 2018

(65) Prior Publication Data
US 2021/0160024 A1 May 27, 2021

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0007* (2013.01); *H04L 5/0023* (2013.01);
(Continued)

(58) Field of Classification Search
None
See application file for complete search history.

(56) References Cited

U.S. PATENT DOCUMENTS 7,436,757 B1* 10/2008 Wilson .................. H04L 5/0058
370/203
9,219,629 B1* 12/2015 Sun ...................... H04L 25/0206
(Continued)

FOREIGN PATENT DOCUMENTS

| CN | 101394263 A | 3/2009 |
| CN | 101989970 A | 3/2011 |

(Continued)

OTHER PUBLICATIONS

Hsieh et al. "Channel Estimation for OFDM sysetms based on comb-type pilot arrangement in freqeuncy selective fading channels" 1998 IEEE pp. 217-225.*

*Primary Examiner* — Bob A Phunkulh
(74) *Attorney, Agent, or Firm* — Kilpatrick Townsend & Stockton, LLP

(57) ABSTRACT

The present invention relates to the technical field of communications, and specifically relates to an uplink transmission method, terminal, and base station, used for providing a pilot frequency transmission solution for a terminal supporting an CP-OFDM waveform, and comprising: a terminal determines a frequency domain starting position of a pilot frequency, the terminal being a terminal using CP-OFDM to perform uplink transmission; on the basis of a comb-type interval and the determined frequency domain starting position, mapping the pilot frequency onto a transmission pilot frequency symbol; and sending the pilot frequency mapped onto the symbol to a base station.

20 Claims, 16 Drawing Sheets

(51) Int. Cl.
*H04W 72/04* (2009.01)
*H04W 72/12* (2009.01)

(52) U.S. Cl.
CPC ...... *H04L 27/2613* (2013.01); *H04L 27/2678* (2013.01); *H04W 72/04* (2013.01); *H04W 72/12* (2013.01)

(56) References Cited

U.S. PATENT DOCUMENTS

| | | | | |
|---|---|---|---|---|
| 2003/0072254 A1* | 4/2003 | Ma | ........................ | H04L 5/0048 370/208 |
| 2008/0123758 A1* | 5/2008 | Paik | .................... | H04L 25/0226 375/260 |
| 2009/0059885 A1* | 3/2009 | Sadek | ................. | H04L 25/0232 370/343 |
| 2009/0252254 A1* | 10/2009 | Kim | .................. | H04L 25/03159 375/295 |
| 2009/0257520 A1* | 10/2009 | Lin | ....................... | H04L 5/0048 375/260 |
| 2010/0149962 A1* | 6/2010 | Cho | ........................ | H04L 5/06 370/210 |
| 2010/0184444 A1* | 7/2010 | Suo | ................... | H04W 72/1289 455/450 |
| 2010/0254341 A1* | 10/2010 | Sun | ....................... | H04L 5/0051 370/330 |
| 2010/0290545 A1* | 11/2010 | Kim | ..................... | H04L 5/0058 375/260 |
| 2011/0222638 A1* | 9/2011 | Park | ................... | H04L 27/3863 375/346 |
| 2012/0219089 A1* | 8/2012 | Murakami | ........ | H04L 25/03942 375/296 |
| 2013/0010898 A1* | 1/2013 | Chiang | ............. | H04L 25/03891 375/316 |
| 2013/0176883 A1 | 7/2013 | Han et al. | | |
| 2014/0016622 A1* | 1/2014 | Bao | ....................... | H04L 5/0051 370/336 |
| 2014/0029428 A1* | 1/2014 | Lin | ....................... | H04L 5/0048 370/235 |
| 2014/0269882 A1* | 9/2014 | Thompson | .......... | H04L 25/0212 375/232 |
| 2015/0071375 A1* | 3/2015 | Kwon | .................. | H04L 27/261 375/295 |
| 2016/0127922 A1* | 5/2016 | Krishnamoorthy | ... | H04W 24/02 370/329 |
| 2016/0234041 A1* | 8/2016 | Chen | ........................ | H04L 1/00 |
| 2016/0234050 A1* | 8/2016 | Nagalpur | .............. | H04L 5/0007 |
| 2016/0373226 A1* | 12/2016 | Wang | ................ | H04L 27/26035 |
| 2017/0111147 A1* | 4/2017 | Cao | ..................... | H04L 27/2613 |
| 2018/0007688 A1* | 1/2018 | Fu | ............................ | H04L 5/14 |
| 2019/0215120 A1* | 7/2019 | Tang | ..................... | H04L 5/0048 |
| 2021/0392660 A1* | 12/2021 | Chen | ................. | H04W 72/1263 |

FOREIGN PATENT DOCUMENTS

| | | |
|---|---|---|
| CN | 104301275 A | 1/2015 |
| CN | 105656817 A | 6/2016 |
| CN | 107181580 A | 9/2017 |
| TW | 201737742 A | 10/2017 |
| WO | 2016204353 A | 12/2016 |
| WO | 2018008739 A1 | 1/2018 |

\* cited by examiner

UPLINK TRANSMISSION METHOD, TERMINAL, AND BASE STATION

This application is a National Stage of International Application No. PCT/CN2018/075135, filed Feb. 2, 2018, which claims priority to Chinese Patent Application No. 201710011427.5, filed Jan. 6, 2017, both of which are hereby incorporated by reference in their entireties.

FIELD

The present invention relates to the field of communications, and particularly to an uplink transmission method, a terminal, and a base station.

BACKGROUND

As there is an evolving demand for mobile communication services, the International Telecommunication Union (ITU), the $3^{rd}$ Generation Partnership Project (3GPP), and other organizations have come to their researches on new wireless communication systems (e.g., a 5G system). The new wireless communication systems can support both a Discrete Fourier Transform-Spread-Orthogonal Frequency Division Multiplexing (DFT-S-OFDM) waveform and a Cyclic Prefix-Orthogonal Frequency Division Multiplexing (CP-OFDM) waveform in uplink transmission, but there has been absent so far a solution to transmitting the different waveforms in a multiplexing mode.

In a Long Term Evolution (LTE) system, a DFT-S-OFDM waveform is applied in the uplink to guarantee a single-carrier characteristic. Pilots (Demodulation Reference Signals (DMRSs)) and data are transmitted in different symbols in the Time Division Multiplexing (TDM) mode as illustrated in FIG. 1.

In the LTE system, uplink transmission is performed in a unit of a sub-frame, where a length of a sub-frame is 1 ms, and there is no OFDM waveform in the uplink, so no DMRS pattern has been defined. In the new wireless communication systems, a length of uplink transmission will not be limited to 1 ms, but may be less than 1 ms, e.g., several symbols; the length of uplink transmission may also vary as a traffic demand is varying; and there is a significant overhead of pilots transmitted in a small number of symbols using a DFT-S-OFDM waveform in the LTE system. Moreover, both a DFT-S-OFDM waveform and a CP-OFDM waveform can be supported in the uplink, and these two waveforms can be applied separately or in a multiplexing mode. For example, terminals supporting different waveforms can perform Multi-User Multiple-Input Multiple-Output (MU-MIMO) transmission over the same frequency-domain resource, or they can transmit pilots in adjacent short TTIs but in the same symbol in a multiplexing mode to thereby improve the utilization ratio of the uplink resource.

At present, there has been absent a solution to transmitting a pilot by a terminal supporting a CP-OFDM waveform, and a solution to transmitting a pilot over the same resource in a multiplexing mode using different waveforms in a wireless communication system.

SUMMARY

Embodiments of the invention provide an uplink transmission method, a terminal, and a base station so as to provide a solution to transmitting a pilot by a terminal supporting a CP-OFDM waveform.

In a first aspect, an embodiment of the invention provides an uplink transmission method including:

determining, by a terminal, a frequency-domain start position of pilots, wherein the terminal is a terminal using CP-OFDM for uplink transmission;

mapping, by the terminal, the pilots onto a pilot transmission symbol, according to a comb interval and the determined frequency-domain start position; and transmitting, by the terminal, the pilots mapped onto the pilot transmission symbol to a base station.

Optionally, determining, by the terminal, the frequency-domain start position of the pilots includes:

determining, by the terminal, the frequency-domain start position of the pilots according to a pre-definition between the terminal and the base station; or determining, by the terminal, the frequency-domain start position of the pilots according to configuration signaling transmitted by the base station.

Optionally, a candidate value of the frequency-domain start position is K, wherein $K \in [0, N-1]$, K is an integer, N is the comb interval, and N is a positive integer.

Optionally, the pilot transmission symbol is one or more symbols predefined between the terminal and the base station; or the pilot transmission symbol is one or more symbols determined by the terminal according to configuration signaling transmitted by the base station.

Optionally, obtaining, by the terminal, the pilots mapped onto the pilot transmission symbol includes:

determining, by the terminal, a cyclic shift value and/or an orthogonal sequence of a pilot sequence; and generating, by the terminal, the pilots according to the cyclic shift value and/or the orthogonal sequence.

Optionally, determining, by the terminal, the cyclic shift value and/or the orthogonal sequence includes:

determining, by the terminal, the cyclic shift value and/or the orthogonal sequence according to a pre-definition between the terminal and the base station; or determining, by the terminal, the cyclic shift value and/or the orthogonal sequence according to configuration signaling transmitted by the base station.

Optionally, there are a plurality of frequency-domain start positions, and mapping, by the terminal, the pilots onto the pilot transmission symbol, according to the comb interval and the determined frequency-domain start position includes:

mapping, by the terminal, a plurality of pilot sequences respectively onto the pilot transmission symbol according to each frequency-domain start position and the comb interval.

Optionally, the method further includes:

determining, by the terminal, not to transmit any data in the pilot transmission symbol; or determining, by the terminal, a frequency-domain start position for transmitting data in the pilot transmission symbol, and mapping data onto the pilot transmission symbol according to the determined frequency-domain start position for transmitting data, and the comb interval.

Optionally, determining, by the terminal, the frequency-domain start position for transmitting data in the pilot transmission symbol includes:

determining, by the terminal, the frequency-domain start position for transmitting data, according to a pre-definition between the terminal and the base station; or determining, by the terminal, the frequency-domain start position for transmitting data, according to configuration signaling transmitted by the base station.

Optionally, the comb interval is predefined between the terminal and the base station; or the comb interval is obtained by the terminal according to configuration signaling transmitted by the base station.

In a second aspect, an embodiment of the invention provides an uplink transmission method including:

determining, by a base station, a frequency-domain start position of pilots of a terminal, wherein the terminal is a terminal using CP-OFDM for uplink transmission; and obtaining, by the base station, the pilots of the terminal in a pilot transmission symbol of the terminal according to a comb interval and the determined frequency-domain start position.

Optionally, the frequency-domain start position of the pilots is predefined between the terminal and the base station; or the frequency-domain start position of the pilots is predetermined by the base station, and transmitted to the terminal via configuration signaling.

Optionally, a candidate value of the frequency-domain start position is K, wherein $K \in [0, N-1]$, K is an integer, N is the comb interval, and N is a positive integer.

Optionally, the pilot transmission symbol is one or more symbols predefined between the terminal and the base station; or the pilot transmission symbol is one or more symbols determined by the base station, and notified to the terminal via configuration signaling.

Optionally, obtaining, by the base station, the pilots mapped onto the pilot transmission symbol includes:

determining, by the base station, a cyclic shift value and/or an orthogonal sequence of a pilot sequence; and obtaining, by the base station, the pilots according to the cyclic shift value and/or the orthogonal sequence.

Optionally, the cyclic shift value and/or the orthogonal sequence are/is predefined between the terminal and the base station; or the cyclic shift value and/or the orthogonal sequence are/is determined by the base station, and notified to the terminal via configuration signaling.

Optionally, there are a plurality of frequency-domain start positions, and obtaining, by the base station, the pilots of the terminal in the pilot transmission symbol of the terminal according to the comb interval and the determined frequency-domain start position includes:

obtaining, by the base station, a plurality of pilot sequences respectively in the pilot transmission symbol according to each frequency-domain start position and the comb interval.

Optionally, the method further includes:

determining, by the base station, that there are not any data transmitted in the pilot transmission symbol; or determining, by the base station, a frequency-domain start position for transmitting data in the pilot transmission symbol, and obtaining data in the pilot transmission symbol according to the determined frequency-domain start position for transmitting data, and the comb interval.

Optionally, the frequency-domain start position for transmitting data is predefined between the terminal and the base station; or the frequency-domain start position for transmitting data is determined by the base station, and transmitted to the terminal via configuration signaling.

Optionally, the comb interval is predefined between the terminal and the base station; or the comb interval is determined by the base station, and transmitted to the terminal via configuration signaling.

In a third aspect, an embodiment of the invention provides an uplink transmission method including:

determining, by a base station, a frequency-domain start position of pilots of each of a plurality of terminals, wherein at least one of the plurality of terminals is a terminal using CP-OFDM for uplink transmission, at least one of the plurality of terminals is a terminal using DFT-S-OFDM for uplink transmission, and uplink transmission resources of the plurality of terminals are overlapped in the frequency domain; and obtaining, by the base station, the pilots of each terminal in a pilot transmission symbol of each terminal according to a comb interval and each determined frequency-domain start position.

Optionally, the frequency-domain start position of the pilots of each terminal is predefined between the base station and each terminal; or the frequency-domain start position of the pilots of each terminal is predetermined by the base station, and transmitted to each terminal via configuration signaling.

Optionally, a candidate value of the frequency-domain start position of each terminal is K, wherein $K \in [0, N-1]$, K is an integer, N is the comb interval, and N is a positive integer.

Optionally, the pilot transmission symbol is one or more symbols predefined between the base station and each terminal; or the pilot transmission symbol is one or more symbols determined by the base station, and notified to each terminal via configuration signaling.

Optionally, obtaining, by the base station, the pilots mapped onto the pilot transmission symbol includes:

determining, by the base station, a cyclic shift value and/or an orthogonal sequence of a pilot sequence of each terminal; and obtaining, by the base station, the pilots of each terminal according to the cyclic shift value and/or the orthogonal sequence of each terminal.

Optionally, the cyclic shift value and/or the orthogonal sequence of each terminal are/is predefined between the base station and each terminal; or the cyclic shift value and/or the orthogonal sequence of each terminal are/is determined by the base station, and notified to each terminal via configuration signaling.

Optionally, there are a plurality of frequency-domain start positions, and obtaining, by the base station, the pilots of each terminal in the pilot transmission symbol of each terminal according to the comb interval and each determined frequency-domain start position of each terminal includes:

for any one of the plurality of terminals, obtaining, by the base station, a plurality of pilot sequences of the terminal respectively in the pilot transmission symbol of the terminal according to each frequency-domain start position of the terminal, and the comb interval.

Optionally, the method further includes:

for any one of the plurality of terminals, determining, by the base station, that there are not any data transmitted in the pilot transmission symbol of the terminal, or determining, by the base station, a frequency-domain start position for transmitting data in the pilot transmission symbol of the terminal, and obtaining data in the pilot transmission symbol of the terminal according to the determined frequency-domain start position for transmitting data, and the comb interval.

Optionally, the frequency-domain start position for transmitting data is predefined between the terminal and the base station; or the frequency-domain start position for transmitting data is determined by the base station, and transmitted to the terminal via configuration signaling.

Optionally, the comb interval is predefined between each terminal and the base station; or the comb interval is determined by the base station, and transmitted to each terminal via configuration signaling.

In a fourth aspect, an embodiment of the invention provides a terminal including:

a determining unit configured to determine a frequency-domain start position of pilots, wherein the terminal is a terminal using CP-OFDM for uplink transmission;

a pilot mapping unit configured to map the pilots onto a pilot transmission symbol, according to a comb interval and the determined frequency-domain start position; and a transmitting unit configured to transmit the pilots mapped onto the pilot transmission symbol to a base station.

Optionally, the determining unit is configured to:

determine the frequency-domain start position of the pilots according to a pre-definition between the terminal and the base station; or determine the frequency-domain start position of the pilots according to configuration signaling transmitted by the base station.

Optionally, a candidate value of the frequency-domain start position is K, wherein K∈[0, N−1], K is an integer, N is the comb interval, and N is a positive integer.

Optionally, the pilot transmission symbol is one or more symbols predefined between the terminal and the base station; or the pilot transmission symbol is one or more symbols determined by the terminal according to configuration signaling transmitted by the base station.

Optionally, the determining unit is further configured to obtain the pilots mapped onto the pilot transmission symbol by:

determining a cyclic shift value and/or an orthogonal sequence of a pilot sequence; and generating the pilot according to the cyclic shift value and/or the orthogonal sequence.

Optionally, the determining unit is configured to: determine the cyclic shift value and/or the orthogonal sequence according to a pre-definition between the terminal and the base station; or determine the cyclic shift value and/or the orthogonal sequence according to configuration signaling transmitted by the base station.

Optionally, there are a plurality of frequency-domain start positions, and the pilot mapping unit is configured to map a plurality of pilot sequences respectively onto the pilot transmission symbol according to each frequency-domain start position and the comb interval.

Optionally, the terminal further includes a data mapping unit configured to:

determine not to transmit any data in the pilot transmission symbol; or determine a frequency-domain start position for transmitting data in the pilot transmission symbol, and mapping data onto the pilot transmission symbol according to the determined frequency-domain start position for transmitting data, and the comb interval.

Optionally, the data mapping unit is configured to: determine the frequency-domain start position for transmitting data, according to a pre-definition between the terminal and the base station; or determine the frequency-domain start position for transmitting data, according to configuration signaling transmitted by the base station.

Optionally, the comb interval is predefined between the terminal and the base station; or the comb interval is obtained by the terminal according to configuration signaling transmitted by the base station.

In a fifth aspect, an embodiment of the invention provides a base station including:

a determining unit configured to determine a frequency-domain start position of pilots of a terminal, wherein the terminal is a terminal using CP-OFDM for uplink transmission; and a pilot obtaining unit configured to obtain the pilots of the terminal in a pilot transmission symbol of the terminal according to a comb interval and the determined frequency-domain start position.

Optionally, the frequency-domain start position of the pilots is predefined between the terminal and the base station; or the frequency-domain start position of the pilots is predetermined by the base station, and transmitted to the terminal via configuration signaling.

Optionally, a candidate value of the frequency-domain start position is K, wherein K∈[0, N−1], K is an integer, N is the comb interval, and N is a positive integer.

Optionally, the pilot transmission symbol is one or more symbols predefined between the terminal and the base station; or the pilot transmission symbol is one or more symbols determined by the base station, and notified to the terminal via configuration signaling.

Optionally, the determining unit is further configured to obtain the pilots mapped onto the pilot transmission symbol by:

determining a cyclic shift value and/or an orthogonal sequence of a pilot sequence; and obtaining the pilots according to the cyclic shift value and/or the orthogonal sequence.

Optionally, the cyclic shift value and/or the orthogonal sequence are/is predefined between the terminal and the base station; or the cyclic shift value and/or the orthogonal sequence are/is determined by the base station, and notified to the terminal via configuration signaling.

Optionally, there are a plurality of frequency-domain start positions, and the pilot obtaining unit is configured to obtain a plurality of pilot sequences respectively in the pilot transmission symbol according to each frequency-domain start position and the comb interval.

Optionally, the base station further includes a data obtaining unit configured to:

determine that there are not any data transmitted in the pilot transmission symbol; or determine a frequency-domain start position for transmitting data in the pilot transmission symbol, and obtain data in the pilot transmission symbol according to the determined frequency-domain start position for transmitting data, and the comb interval.

Optionally, the frequency-domain start position for transmitting data is predefined between the terminal and the base station; or the frequency-domain start position for transmitting data is determined by the base station, and transmitted to the terminal via configuration signaling.

Optionally, the comb interval is predefined between the terminal and the base station; or the comb interval is determined by the base station, and transmitted to the terminal via configuration signaling.

In a sixth aspect, an embodiment of the invention provides a base station including:

a determining unit configured to determine a frequency-domain start position of pilots of each of a plurality of terminals, wherein at least one of the plurality of terminals is a terminal using CP-OFDM for uplink transmission, at least one of the plurality of terminals is a terminal using DFT-S-OFDM for uplink transmission, and uplink transmission resources of the plurality of terminals are overlapped in the frequency domain; and a pilot obtaining unit configured to obtain the pilots of each of the plurality of terminals in a pilot transmission symbol of each terminal according to a comb interval and each determined frequency-domain start position.

Optionally, the frequency-domain start position of the pilots of each terminal is predefined between the base station and each terminal; or the frequency-domain start position of the pilots of each terminal is predetermined by the base station, and transmitted to each terminal via configuration signaling.

Optionally, a candidate value of the frequency-domain start position of each terminal is K, wherein K∈[0, N−1], K is an integer, N is the comb interval, and N is a positive integer.

Optionally, the pilot transmission symbol is one or more symbols predefined between the base station and each terminal; or the pilot transmission symbol is one or more symbols determined by the base station, and notified to each terminal via configuration signaling.

Optionally, the determining unit is further configured to obtain the pilots mapped onto the pilot transmission symbol by:

determining a cyclic shift value and/or an orthogonal sequence of a pilot sequence of each terminal; and obtaining the pilots of each terminal according to the cyclic shift value and/or the orthogonal sequence of each terminal.

Optionally, the cyclic shift value and/or the orthogonal sequence of each terminal are/is predefined between the base station and each terminal; or the cyclic shift value and/or the orthogonal sequence of each terminal are/is determined by the base station, and notified to each terminal via configuration signaling.

Optionally, there are a plurality of frequency-domain start positions, and the pilot obtaining unit is configured to obtain, for any one of the plurality of terminals, a plurality of pilot sequences of the terminal respectively in the pilot transmission symbol according to each frequency-domain start position of the terminal, and the comb interval.

Optionally, the base station further includes a data obtaining unit configured to:

determine, for any one of the plurality of terminals, that there are not any data transmitted in the pilot transmission symbol of the terminal, or determine a frequency-domain start position for transmitting data in the pilot transmission symbol of the terminal, and obtain data in the pilot transmission symbol of the terminal according to the determined frequency-domain start position for transmitting data, and the comb interval.

Optionally, the frequency-domain start position for transmitting data is predefined between the terminal and the base station; or the frequency-domain start position for transmitting data is determined by the base station, and transmitted to the terminal via configuration signaling.

Optionally, the comb interval is predefined between each terminal and the base station; or the comb interval is determined by the base station, and transmitted to each terminal via configuration signaling.

In a seventh aspect, an embodiment of the invention provides another terminal including:

a memory configured to store program instructions; and a processor configured to invoke the program instructions in the memory to:

determine a frequency-domain start position of pilots, wherein the terminal is a terminal using CP-OFDM for uplink transmission;

map the pilots onto a pilot transmission symbol, according to a comb interval and the determined frequency-domain start position; and transmit the pilots mapped onto the pilot transmission symbol to a base station.

In an eighth aspect, an embodiment of the invention provides another base station including:

a memory configured to store program instructions; and a processor configured to invoke the program instructions in the memory to:

determine a frequency-domain start position of pilots of a terminal, wherein the terminal is a terminal using CP-OFDM for uplink transmission; and obtain the pilots of the terminal in a pilot transmission symbol of the terminal according to a comb interval and the determined frequency-domain start position.

In a ninth aspect, an embodiment of the invention provides another base station including:

a memory configured to store program instructions; and a processor configured to invoke the program instructions in the memory to:

determine a frequency-domain start position of pilots of each of a plurality of terminals, wherein at least one of the plurality of terminals is a terminal using CP-OFDM for uplink transmission, at least one of the plurality of terminals is a terminal using DFT-S-OFDM for uplink transmission, and uplink transmission resources of the plurality of terminals are overlapped in the frequency domain, and obtain the pilots of each of the plurality of terminals in a pilot transmission symbol of each terminal according to a comb interval and each determined frequency-domain start position.

In a tenth aspect, an embodiment of the invention provides a computer storage medium storing computer executable instructions configured to cause a computer to perform the method according to any one of the embodiments of the invention.

In the embodiments of the invention, a terminal determines a frequency-domain start position of a pilot, where the terminal is a terminal using CP-OFDM for uplink transmission; maps the pilot onto a pilot transmission symbol, according to a comb interval and the determined frequency-domain start position; and transmits the pilot mapped onto the pilot transmission symbol to a base station. The embodiments of the invention provide a solution to mapping pilots onto the same symbol, and transmitting the pilots in a multiplexing mode, in the uplink by a terminal using CP-OFDM for uplink transmission, and since the pilots are mapped onto the symbol at the comb interval, a plurality of pilot sequences of a terminal can be mapped onto one symbol, or a plurality of pilot sequences of different terminals can be mapped onto one symbol, so that the terminals can transmit the pilots in a multiplexing mode. When there are different waveforms of the different terminals, the different waveforms can be transmitted over the same resource in a multiplexing mode to thereby improve the utilization ratio of the uplink resource.

BRIEF DESCRIPTION OF THE DRAWINGS

In order to make the technical solutions according to the embodiments of the invention more apparent, the drawings to which reference is to be made in the description of the embodiments will be introduced below in brevity, and apparently the embodiments to be described below are only some embodiments of the invention. Those ordinarily skilled in the art can further derive the other drawings from these drawings without any inventive effort.

FIG. 5-1 is a schematic diagram of a first pilot mapping according to an embodiment of the invention.

FIG. 5-2 is a schematic diagram of a second pilot mapping according to an embodiment of the invention.

FIG. 5-3 is a schematic diagram of a third pilot mapping according to an embodiment of the invention.

FIG. 5-4 is a schematic diagram of a fourth pilot mapping according to an embodiment of the invention.

FIG. 5-5 is a schematic diagram of a fifth pilot mapping according to an embodiment of the invention.

FIG. 5-6 is a schematic diagram of a sixth pilot mapping according to an embodiment of the invention.

FIG. 5-7 is a schematic diagram of a seventh pilot mapping according to an embodiment of the invention.

FIG. 5-8 is a schematic diagram of an eighth pilot mapping according to an embodiment of the invention.

FIG. 5-9 is a schematic diagram of a ninth pilot mapping according to an embodiment of the invention.

FIG. 6 is a schematic diagram of a tenth pilot mapping according to an embodiment of the invention.

FIG. 7 is a schematic diagram of frequency-domain start positions according to an embodiment of the invention.

FIG. 8 is a schematic diagram of a terminal according to an embodiment of the invention.

FIG. 9 is a schematic diagram of a first base station according to an embodiment of the invention.

DETAILED DESCRIPTION OF THE EMBODIMENTS

Figure 1:
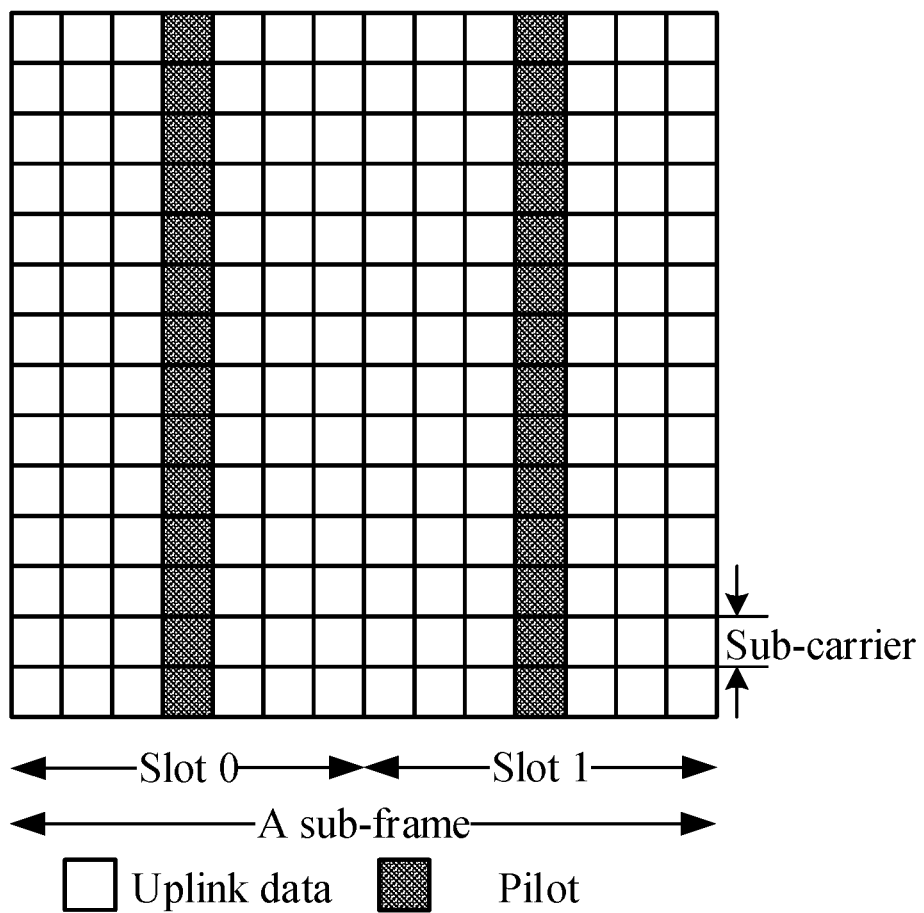
FIG. 1 is a schematic structural diagram of LTE PUSCH pilots in the prior art.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

The embodiments of the invention will be described below in further details with reference to the drawings.

The embodiments of the invention can be applicable to a 4th Generation (4G) mobile communication system, e.g., a Long Term Evolution (LTE) system, or a $5^{th}$ Generation (5G) mobile communication system, e.g., an access network operating with a new Radio Access Technology (RAT), a Cloud Radio Access Network (CRAN), or another communication system. A part of terms in the invention will be explained below for the sake of convenient understanding by those skilled in the art.

1) A terminal, also referred to as a User Equipment (UE), is a device providing a user with voice and/or data connectivity, e.g., a handheld device, an on-vehicle device, etc., with a wireless connection function. For example, common terminals include a mobile phone, a tablet computer, a notebook computer, a palm computer, a Mobile Internet Device (MID), a wearable device, e.g., a smart watch, a smart wristband, a pedometer, etc.

2) A base station, also referred to as a Radio Access Network (RAN) device, is a device providing a terminal with an access to a radio network, and including but not limited to an evolved Node B (eNB), a Radio Network Controller (RNC), a Node B (NB), a Base Station Controller (BSC), a Base Transceiver Station (BTS), a Home evolved Node B or Home Node B (HNB), a Baseband Unit (BBU), etc. Moreover, the base station can further include a WIFI Access Point (AP), etc.

3) A "plurality of" refers to two or more; "and/or" describes an association between associated objects, and represents three possible relationships, and for example, "A and/or B" can represent three instances of A alone, B alone, and both A and B; and the symbol "/" generally represents an "or" relationship between associated objects preceding and succeeding to the symbol.

4) In the embodiments of the invention, a symbol includes but will not be limited to an Orthogonal Frequency Division Multiplexing (OFDM) symbol, a Sparse Code Multiplexing Access (SCMA) symbol, a Filtered Orthogonal Frequency Division Multiplexing (F-OFDM) symbol, a Non-Orthogonal Multiple Access (NOMA) symbol, a Single-Carrier Frequency-Division Multiple Access (SC-FDMA) symbol, a Discrete Fourier Transform-Spread-Orthogonal Frequency Division Multiplexing (DFT-S-OFDM) symbol, a Cyclic Prefix-Orthogonal Frequency Division Multiplexing (CP-OFDM) symbol, a Pattern Division Multiple Access (PDMA) symbol, etc., particularly as needed in practice, and a detailed description thereof will be omitted here.

Figure 2:
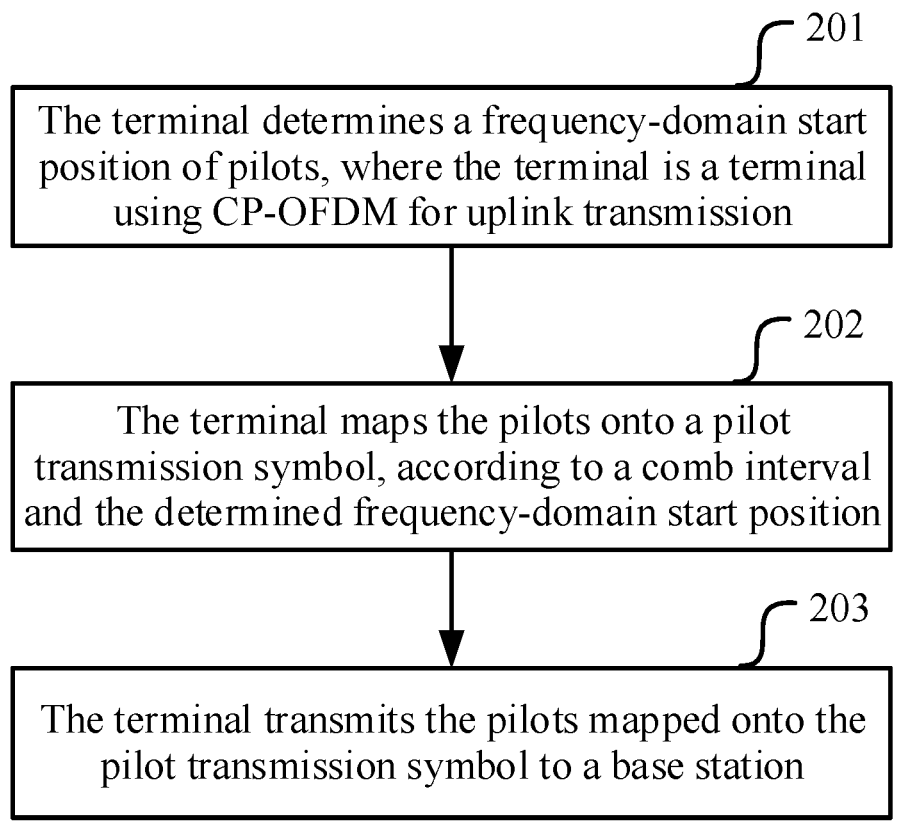
FIG. 2 is a flow chart of an uplink transmission method according to an embodiment of the invention.

As illustrated in FIG. 2, an embodiment of the invention provides an uplink transmission method performed by a terminal, where the method includes the following operations.

In the operation 201, the terminal determines a frequency-domain start position of pilots, where the terminal is a terminal using CP-OFDM for uplink transmission.

In the operation 202, the terminal maps the pilots onto a pilot transmission symbol, according to a comb interval and the determined frequency-domain start position.

In the operation 203, the terminal transmits the pilots mapped onto the pilot transmission symbol to a base station.

In this embodiment, the terminal is a terminal configured or predefined to use the CP-OFDM for uplink transmission.

In the operation 201 above, the terminal determines the frequency-domain start position of the pilots, and particularly the terminal determines the frequency-domain start position of the pilots according to a pre-definition between the terminal and the base station, or the terminal determines the frequency-domain start position of the pilots according to configuration signaling transmitted by the base station.

Here a candidate value of the frequency-domain start position is K, where K∈[0, N−1], K is an integer, N is the comb interval, and N is a positive integer, where the comb interval can also be referred to as a comb position or index.

In the operation 202 above, the terminal maps the pilots onto the pilot transmission symbol, according to the comb interval and the determined frequency-domain start position, where the pilot transmission symbol is one or more symbols predefined between the terminal and the base station, or one or more symbols determined by the terminal according to configuration signaling transmitted by the base station.

Stated otherwise, the pilot transmission symbol may be one symbol or may be a plurality of symbols, and may be a predefined symbol at a fixed position, or a specified symbol according to configuration signaling transmitted by the base station.

Furthermore, the pilots mapped onto the pilot transmission symbol are obtained as follows.

The terminal determines a cyclic shift value and/or an orthogonal sequence of a pilot sequence, and then generates the pilots according to the cyclic shift value and/or the orthogonal sequence.

Here the terminal determines the pilot sequence particularly as follows: the terminal determines the cyclic shift value and/or the orthogonal sequence according to a pre-definition between the terminal and the base station, or the terminal determines the cyclic shift value and/or the orthogonal sequence according to configuration signaling transmitted by the base station.

The comb interval is particularly represented as a mapping interval of each element in the pilot sequence onto a frequency-domain resource in a symbol (e.g., a difference between indexes of sub-carriers mapped-thereon), or a pilot multiplexing factor (that is, pilots of a plurality of different instances of uplink transmission can be transmitted in a resource block in a frequency division multiplexing mode).

Where, the comb interval is predefined between the terminal and the base station, or the comb interval is obtained by the terminal according to configuration signaling transmitted by the base station.

When there are a plurality of frequency-domain start positions, the terminal maps a plurality of pilot sequences respectively onto the pilot transmission symbol according to each frequency-domain start position and the comb interval, and the pilot sequences corresponding to the different frequency-domain start positions can be generated separately (that is, can correspond to different cyclic shift values and/or orthogonal sequences) or can be identical sequences.

Furthermore, the terminal decides not to transmit any data in the pilot transmission symbol; or the terminal determines a frequency-domain start position for transmitting data in the pilot transmission symbol, and maps data onto the pilot transmission symbol according to the determined frequency-domain start position for transmitting data, and the comb interval.

Here the terminal determines whether there is a resource for transmitting data, in the pilot transmission symbol according to a configuration of configuration signaling, or a pre-definition between the terminal and the base station.

If it is determined that there is a resource for transmitting data in the pilot transmission symbol, then the terminal will further determine a frequency-domain start position for transmitting data, according to a pre-definition between the terminal and the base station, or the terminal will further determine a frequency-domain start position for transmitting data, according to configuration signaling transmitted by the base station.

The configuration of configuration signaling and the pre-definition between the terminal and the base station can apply to all the frequency-domain resources scheduled for the terminal, or can be configured or predefined separately for each resource block or each sub-band in a frequency-domain resource scheduled for the terminal.

The configuration signaling as mentioned above can be higher-layer signaling, or an indication field in a downlink control channel carrying an uplink grant (i.e., a downlink control channel in an uplink Downlink Control Information (DCI) format).

In the operation 203 above, the terminal transmits the pilots mapped onto the pilot transmission symbol to the base station.

In the embodiment of the invention, the terminal determines a frequency-domain start position of pilots, where the terminal is a terminal transmitting in the uplink using CP-OFDM; maps the pilots onto a symbol for transmitting a pilot, according to a comb interval and the determined frequency-domain start position; and transmits the pilots mapped onto the symbol to a base station. The embodiment of the invention provides a solution to mapping pilots and transmitting the pilots in the uplink by a terminal transmitting in the uplink using CP-OFDM, and since the pilots are mapped onto the symbol according to the comb interval, a plurality of pilot sequences of a terminal can be mapped onto one symbol, or a plurality of pilot sequences of different terminals can be mapped onto one symbol, so that the terminals can transmit the pilots in a multiplexing mode to thereby improve the utilization ratio of the uplink resource.

Figure 3:
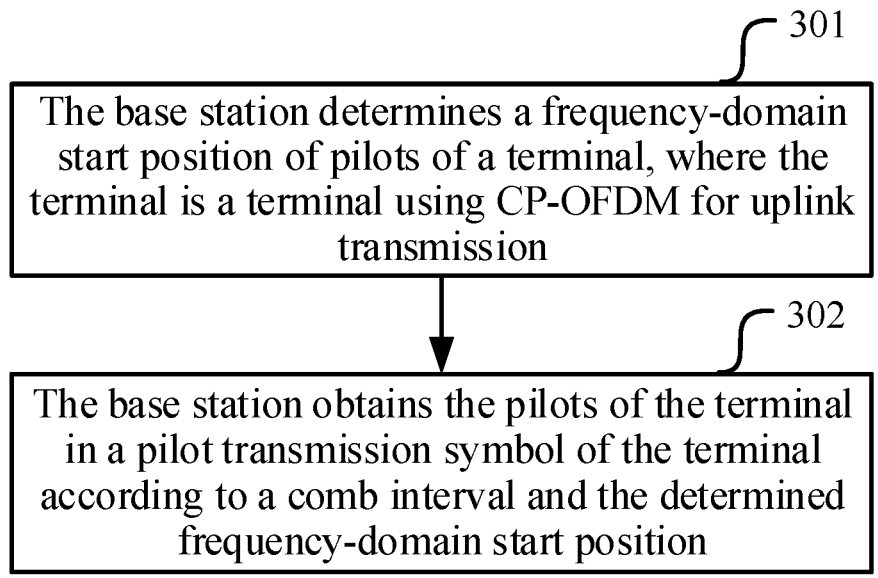
FIG. 3 is a flow chart of an uplink transmission method according to an embodiment of the invention.

As illustrated in FIG. 3, an embodiment of the invention provides an uplink transmission method performed by a base station, where the method includes following operations.

In the operation 301, the base station determines a frequency-domain start position of pilots of a terminal, where the terminal is a terminal using CP-OFDM for uplink transmission.

In the operation 302, the base station obtains the pilots of the terminal in a pilot transmission symbol of the terminal according to a comb interval and the determined frequency-domain start position.

The operation 301 and the operation 302 above are a flow of the method at the base station side, which corresponds to the flow of the method at the terminal side as illustrated in FIG. 2.

In the operation 301, the base station determines the frequency-domain start position of the pilots of the terminal, where the terminal is a terminal using CP-OFDM for uplink transmission.

Particularly, the frequency-domain start position of the pilots is predefined between the terminal and the base station, or the frequency-domain start position of the pilots is predetermined by the base station, and transmitted to the terminal via configuration signaling.

Where, a candidate value of the frequency-domain start position is K, where K∈[0, N−1], K is an integer, N is the comb interval, and N is a positive integer.

The comb interval is particularly represented as a mapping interval of each element in a pilot sequence onto a frequency-domain resource in a symbol (e.g., a difference between indexes of sub-carriers mapped-thereon), or a pilot multiplexing factor (that is, pilots of a plurality of different instances of uplink transmission can be transmitted in a resource block in a frequency division multiplexing mode).

The comb interval is predefined between the terminal and the base station, or the comb interval is obtained by the terminal according to configuration signaling transmitted by the base station.

In the operation 302 above, the base station obtains the pilots of the terminal in the pilot transmission symbol of the terminal according to the comb interval and the determined frequency-domain start position.

Here the pilot transmission symbol is one or more symbols predefined between the terminal and the base station, or the pilot transmission symbol is one or more symbols determined by the base station, and notified to the terminal via configuration signaling.

Particularly, the base station obtains the pilots mapped onto the pilot transmission symbol as follows.

The base station determines a cyclic shift value and/or an orthogonal sequence of a pilot sequence, and obtains the pilots according to the cyclic shift value and/or the orthogonal sequence.

Here the cyclic shift value and/or the orthogonal sequence are/is predefined between the terminal and the base station, or determined by the base station, and notified to the terminal via configuration signaling.

Furthermore, when there are a plurality of frequency-domain start positions, the base station obtains a plurality of pilot sequences respectively in the pilot transmission symbol according to each frequency-domain start position and the comb interval.

The base station determines that there are not any data transmitted in the pilot transmission symbol; or the base station determines a frequency-domain start position for transmitting data in the pilot transmission symbol, and obtains data in the pilot transmission symbol according to the determined frequency-domain start position for transmitting data, and the comb interval.

Here the frequency-domain start position for transmitting data is predefined between the terminal and the base station, or the frequency-domain start position for transmitting data is determined by the base station, and transmitted to the terminal via configuration signaling.

In the embodiment of the invention, the base station receives pilots, transmitted by a terminal, mapped onto a pilot transmission symbol, where the terminal is a terminal transmitting in the uplink using CP-OFDM; the base station determines a frequency-domain start position of the pilots; and the base station obtains the pilots of the terminal according to a comb interval and the determined frequency-domain start position. The embodiment of the invention provides a solution to mapping pilots and transmitting the pilots, in the uplink by a terminal transmitting in the uplink using CP-OFDM, and since the pilots are mapped onto the symbol according to the comb interval, a plurality of pilot sequences of a terminal can be mapped onto one symbol, or a plurality of pilot sequences of different terminals can be mapped onto one symbol, so that the terminals can transmit the pilots in a multiplexing mode. When there are different waveforms of the different terminals, the different waveforms can be transmitted over the same resource in a multiplexing mode to thereby improve the utilization ratio of the uplink resource.

Figure 4:
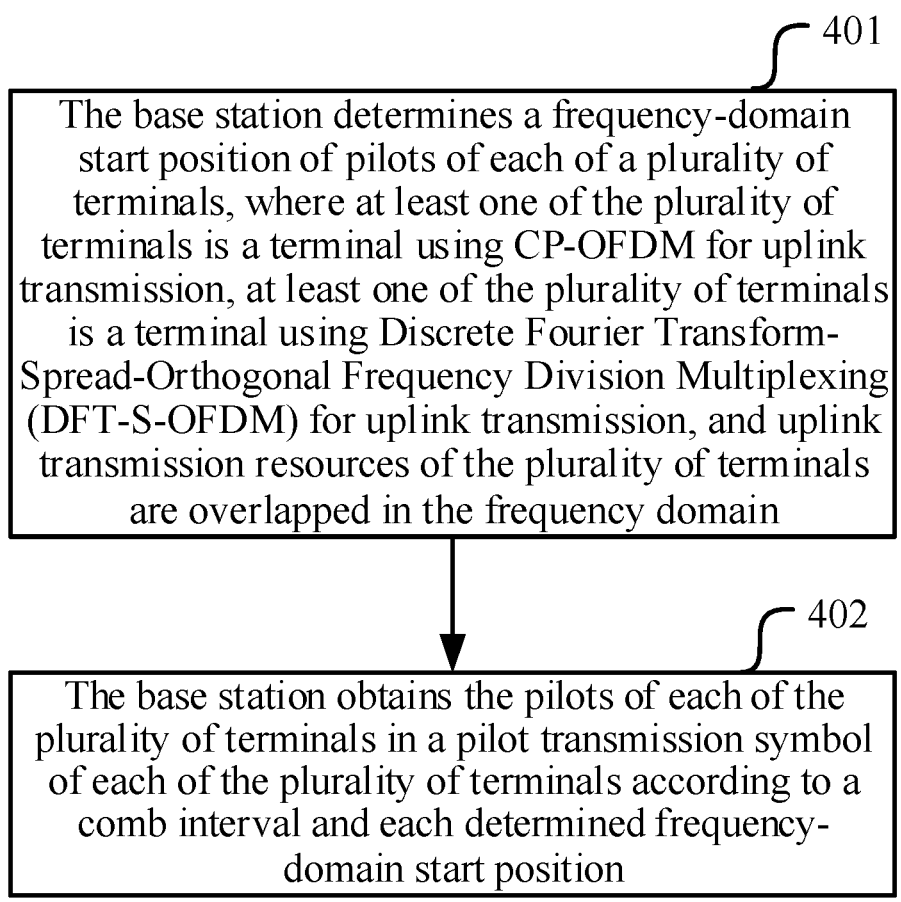
FIG. 4 is a flow chart of an uplink transmission method according to an embodiment of the invention.

As illustrated in FIG. 4, an embodiment of the invention provides an uplink transmission method performed by a base station, where the method includes the following operations.

In the operation 401, the base station determines a frequency-domain start position of pilots of each of a plurality of terminals, where at least one of the plurality of terminals is a terminal using CP-OFDM for uplink transmission, at least one of the plurality of terminals is a terminal using Discrete Fourier Transform-Spread-Orthogonal Frequency Division Multiplexing (DFT-S-OFDM) for uplink transmission, and uplink transmission resources of the plurality of terminals are overlapped in the frequency domain.

In the operation 402, the base station obtains the pilots of each of the plurality of terminals in a pilot transmission symbol of each of the plurality of terminals according to a comb interval and each determined frequency-domain start position.

The operation 401 and the operation 402 above are a flow of the method at the base station side, which is different from the flow of the method at the base station side as illustrated in FIG. 3 in that the flow of the method as illustrated in FIG. 4 is a method flow for uplink transmission of a plurality of terminals as opposed to the flow of the method as illustrated in FIG. 3, which is a method flow for uplink transmission of a single terminal.

In the operation 401 above, the base station determines the frequency-domain start position of the pilots of each of the plurality of terminals.

Here at least one of the terminals is a terminal using CP-OFDM for uplink transmission, and at least one of the terminals is a terminal using DFT-S-OFDM for uplink transmission.

Particularly, the frequency-domain start position of pilots is predefined between the base station and each terminal, or the frequency-domain start position of pilots is predetermined by the base station, and transmitted to each terminal via configuration signaling.

A candidate value of the frequency-domain start position of each terminal is K, where $K \in [0, N-1]$, K is an integer, N is the comb interval, and N is a positive integer.

The comb interval is particularly represented as a mapping interval of each element in a pilot sequence onto a frequency-domain resource in a symbol (e.g., a difference between indexes of sub-carriers mapped-thereon), or a pilot multiplexing factor (that is, pilots of a plurality of different instances of uplink transmission can be transmitted in a resource block in a frequency division multiplexing mode).

The comb interval is predefined between each terminal and the base station, or the comb interval is obtained by each terminal according to configuration signaling transmitted by the base station.

In the operation 402 above, the base station obtains the pilots of each terminal in the pilot transmission symbol of each terminal according to the comb interval and the determined frequency-domain start position.

Here the pilot transmission symbol is one or more symbols predefined between the base station and each terminal, or the pilot transmission symbol is one or more symbols determined by the base station, and notified to each terminal via configuration signaling.

Particularly, the base station obtains the pilots mapped onto the pilot transmission symbol as follows.

The base station determines a cyclic shift value and/or an orthogonal sequence of a pilot sequence of each terminal, and obtains the pilots of each terminal according to the cyclic shift value and/or the orthogonal sequence.

Here the cyclic shift value and/or the orthogonal sequence are/is predefined between the base station and each terminal, or determined by the base station, and notified to each terminal via configuration signaling.

Furthermore, when there are a plurality of frequency-domain start positions, the base station obtains for any one of the terminals a plurality of pilot sequences of the terminal respectively in the pilot transmission symbol of the terminal according to each frequency-domain start position of the terminal, and the comb interval.

The base station determines for any one of the terminals that there are not any data transmitted in the pilot transmission symbol of the terminal, or the base station determines a frequency-domain start position for transmitting data in the pilot transmission symbol of the terminal, and obtains data in the pilot transmission symbol of the terminal according to the determined frequency-domain start position for transmitting data, and the comb interval.

Here the frequency-domain start position for transmitting data is predefined between the terminal and the base station, or the frequency-domain start position for transmitting data is determined by the base station, and transmitted to the terminal via configuration signaling.

In the embodiment of the invention, the base station receives pilots, transmitted by a plurality of terminals, mapped onto a pilot transmission symbol, where at least one of the terminals is a terminal using CP-OFDM for uplink transmission, at least one of the terminals is a terminal using DFT-S-OFDM for uplink transmission, and uplink transmission resources of the terminals are overlapped in the frequency domain; the base station determines a frequency-domain start position of pilots of each terminal; and the base station obtains the pilots of each terminal according to a comb interval and each determined frequency-domain start position. The embodiment of the invention provides a solution to mapping pilots onto the same symbol and transmitting the pilots in a multiplexing mode, in the uplink by a terminal transmitting in the uplink using CP-OFDM, and a terminal transmitting in the uplink using DFT-S-OFDM, and since the pilots are mapped onto the symbol at the comb interval, a plurality of pilot sequences of a terminal can be mapped onto one symbol, or a plurality of pilot sequences of different terminals can be mapped onto one symbol, so that the terminals can transmit the pilots in a multiplexing mode. When there are different waveforms of the different terminals, the different waveforms can be transmitted over the same resource in a multiplexing mode to thereby improve the utilization ratio of the uplink resource.

The embodiment of the invention provides a method of transmission in a multiplexing mode using different waveforms, where a uniform pilot transmission structure is defined for the different waveforms, there is a comb interval of the pilot transmission structure, and terminals using the different waveforms can transmit over the same frequency-domain resource in an MU-MIMO mode, or they can transmit in adjacent short Transmission Time Intervals (TTIs) but in the same symbol in a multiplexing mode to thereby improve the utilization ratio of the uplink resource.

Particular implementations of the uplink transmission methods above at the UE side and the base station side will be described below in details in connection with particular embodiments thereof.

Figures 1, 5:
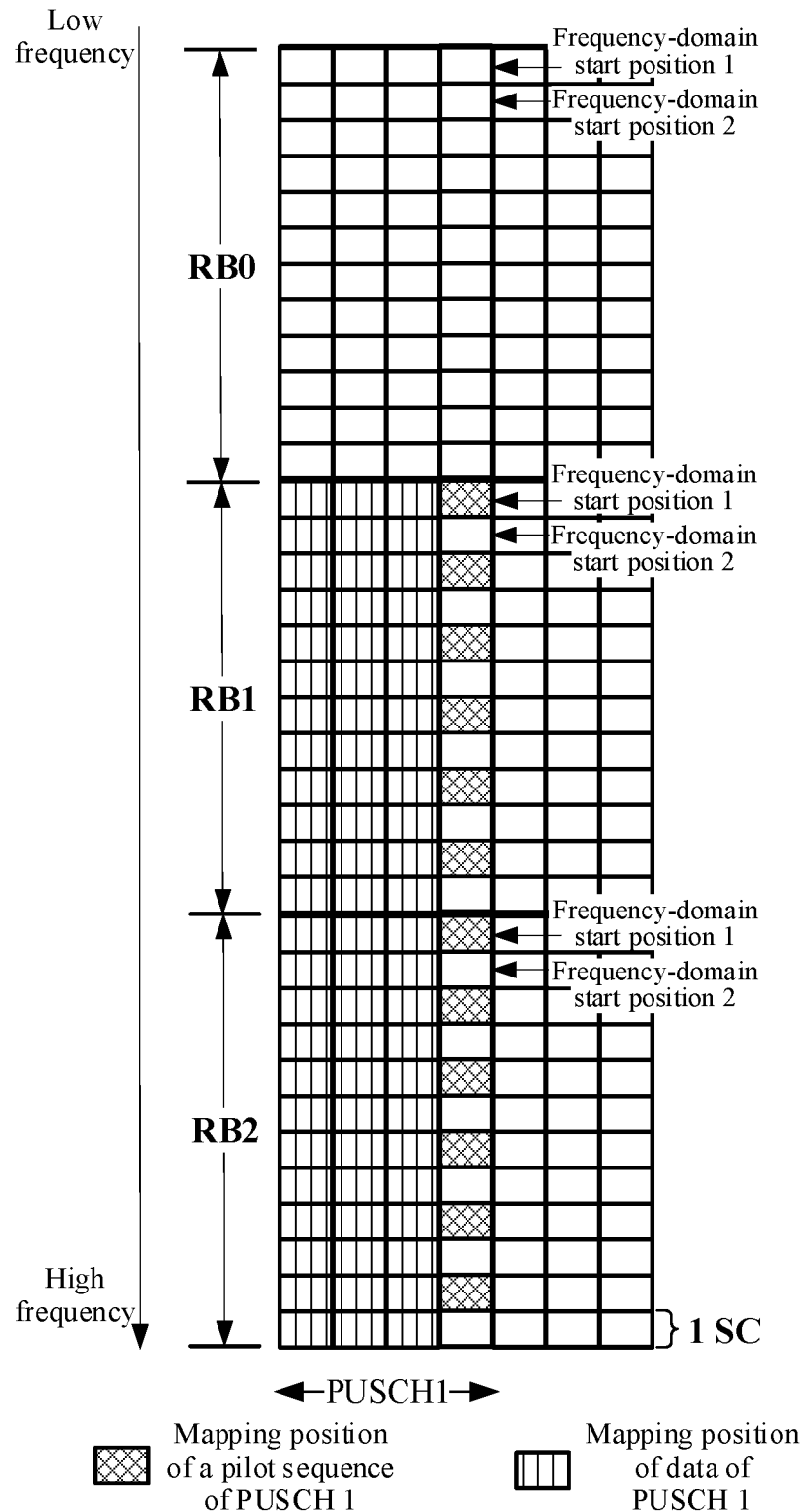
Figures 2, 5:
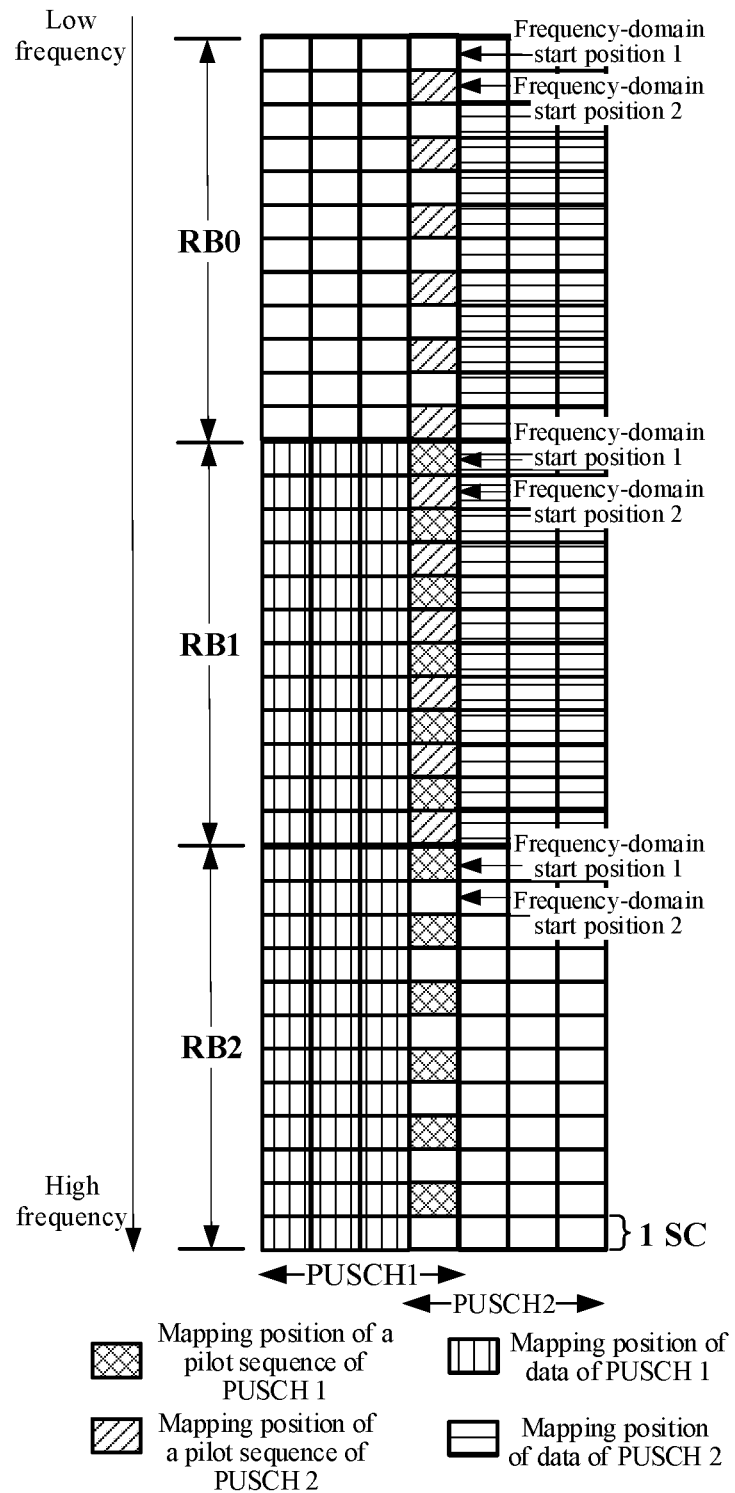
Figures 3, 5:
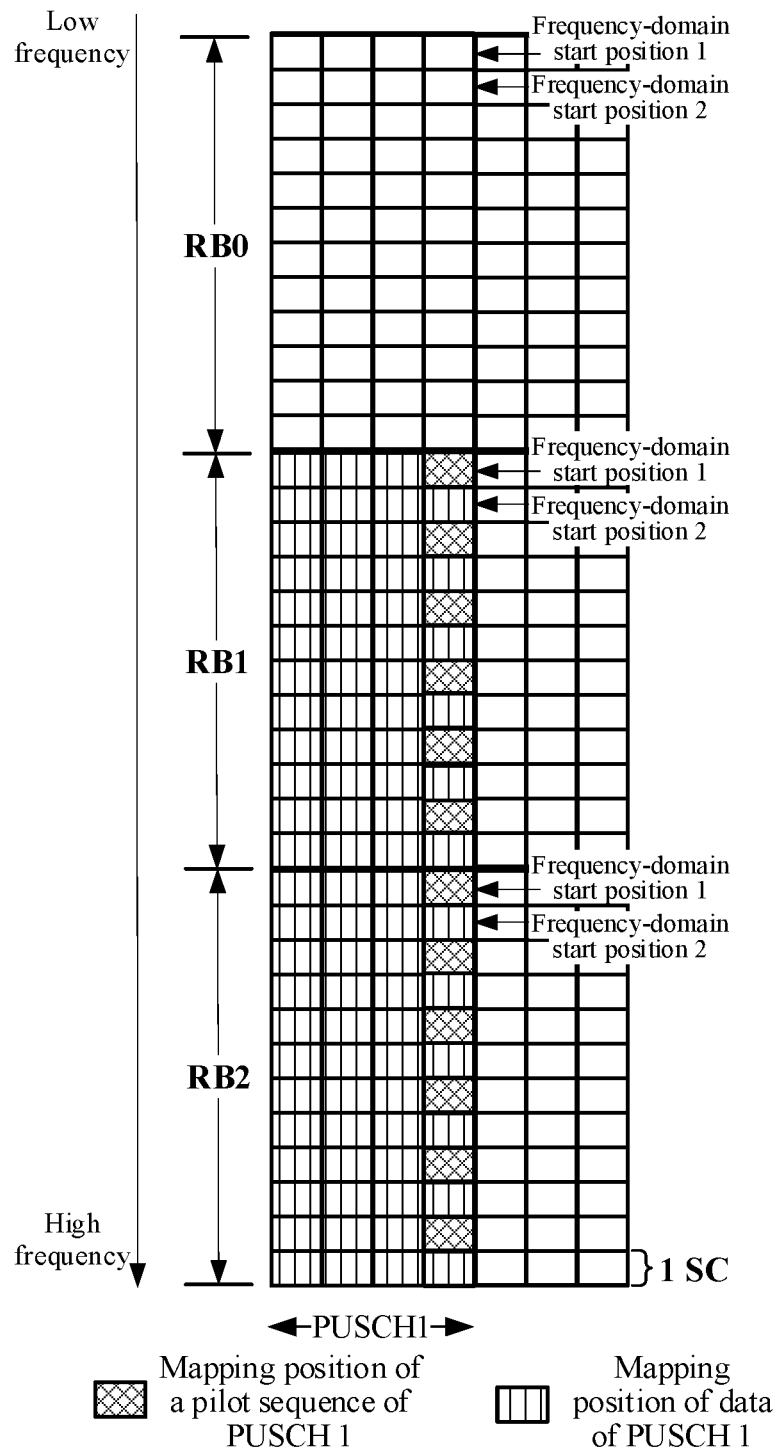
Figures 4, 5:
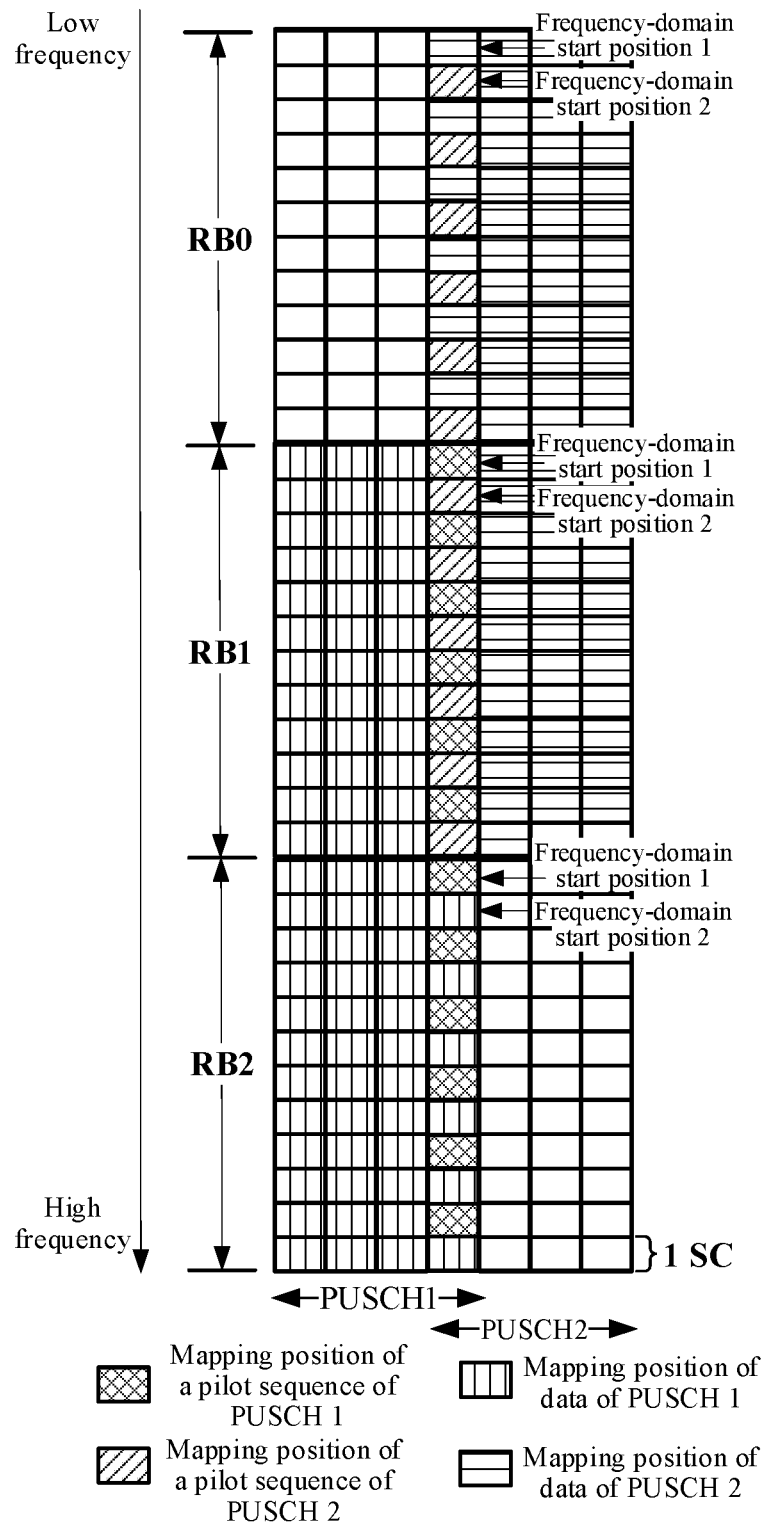
Figure 5:
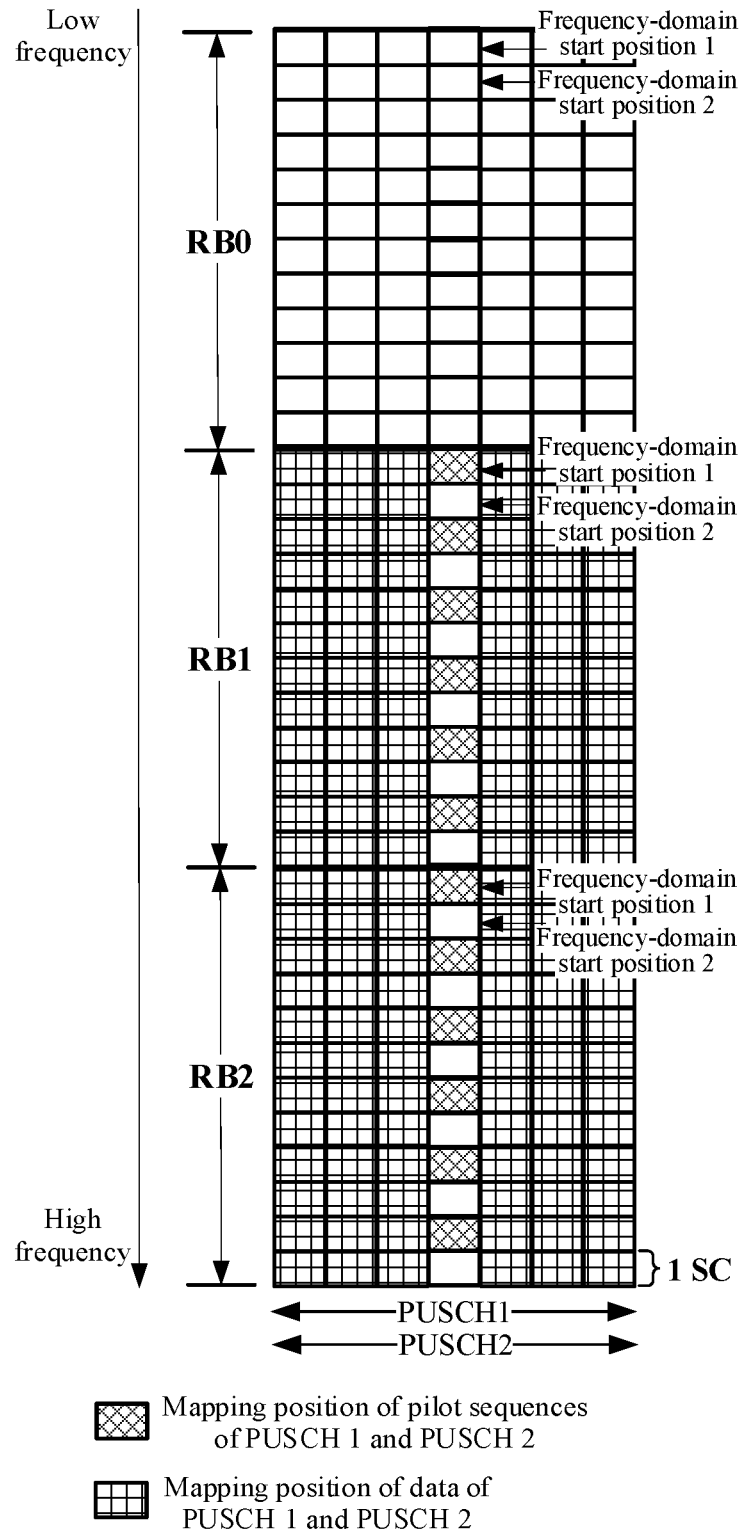

FIG. 5-1 illustrates a schematic structural diagram of a slot according to an embodiment of the invention, where the fourth symbol is predefined or configured as a pilot transmission symbol, a terminal A transmits a Physical Uplink Sharing Channel (PUSCH) using CP-OFDM, and a comb interval or a number of combs can be predefined or preconfigured by a base station as 3, that is, pilots transmitted in a PUSCH are mapped at an interval of every two Resource Elements (REs), that is, REs 0, 2, 4, 6, 8, and 10 can be a group of pilot positions, and REs 1, 3, 5, 7, 9, and 11 can be another group of pilot positions, in a Resource Block (RB); and pilots of different terminals can be transmitted in the fourth symbol in an FDM mode, so there are two frequency-domain start positions of pilots in an RB as illustrated in FIG. 5-1.

Implementations at the base station side are as follows.

First Implementation: the base station transmits a UL grant 1 (i.e., a downlink control channel carrying an uplink grant) to the terminal A to schedule the terminal A to transmit a PUSCH 1 in the first four symbols in RBs 1 and 2; and the base station predetermines an available frequency-domain start position of pilots of the terminal A according to a scheduling condition, and notifies the terminal in a first indication field in the UL grant 1 (or of course, it can alternatively notify the terminal otherwise, and this will apply hereinafter, so a repeated description thereof will be omitted here). For example, if the frequency-domain start position of the pilots of the terminal A is determined as a first frequency-domain start position, then the 1-bit first indication field in the UL grant 1 will indicate "0", where a correspondence relationship between a frequency-domain start position, and the value of the first indication field is as depicted in Table 1 (Table 1 only depicts an example thereof, but another correspondence relationship shall also fall into the scope of the invention).

TABLE 1

| First indication field of a frequency-domain start position of pilots in a UL grant | Indicated frequency-domain start position |
| --- | --- |
| 0 | First frequency-domain start position |
| 1 | Second frequency-domain start position |

Stated otherwise, if the first indication field of the frequency-domain start position of pilots in the UL grant is "0", then the terminal will map pilots starting with the first frequency-domain start position; and if the first indication field of the frequency-domain start position of pilots in the UL grant is "1", then the terminal will map pilots starting with the second frequency-domain start position.

At this time, it is always assumed that data are not transmitted in the pilot transmission symbol, that is, if no other terminal transmits pilots over an RE source at the second frequency-domain start position in the pilot transmission symbol, then the RE source will be idle as illustrated in FIG. 5-1.

If a PUSCH 2 is transmitted in the last four symbols (for the terminal A or another terminal), then the base station may notify the terminal of the second frequency-domain start position similarly to the PUSCH 1 above, for transmitting pilots of the PUSCH 2, so the pilots of the different PUSCHs can be transmitted in the same symbol in a multiplexing mode as illustrated in FIG. 5-2, where when the different PUSCHs correspond to different terminals, there may be the same or different waveforms thereof.

Second Implementation: before a UL grant 1 is transmitted to the terminal A, the base station can further determine whether pilots of another PUSCH are transmitted in the pilot transmission symbol in a multiplexing mode, and for example, if there is no other PUSCH transmitted in the last four symbols (for the terminal A or another terminal, which will apply hereinafter), then the base station may further decide to notify the terminal A of the second frequency-domain start position in the pilot transmission symbol, for transmitting data of the PUSCH 1, and for example, a second indication field in the UL grant 1 indicates whether data can be transmitted over a resource in the pilot transmission symbol, and an available frequency-domain start position for data, where a correspondence relationship is as depicted in Table 2 below (Table 2 only depicts an example thereof, but another correspondence relationship shall also fall into the scope of the invention).

TABLE 2

| Second indication field of a frequency-domain start position of data in a UL grant | Indicated frequency-domain start position |
| --- | --- |
| 00 | Resources in the pilot transmission symbol are not used |
| 01 | First frequency-domain start position |
| 10 | Second frequency-domain start position |
| 11 | First and second frequency-domain start positions (or reserved) |

Particularly, the base station transmits the UL grant 1 to the terminal A to schedule the terminal A to transmit a PUSCH 1 in the first four symbols in RBs 1 and 2, where a first indication field in the UL grant 1 indicates "0", that is, pilots of the PUSCH 1 are mapped in a comb pattern starting with the first frequency-domain start position in the pilot transmission symbol, and a second indication field in the UL grant 1 indicates "10", that is, data of the PUSCH 1 can be mapped in a comb pattern starting with the second frequency-domain start position in the pilot transmission symbol, as illustrated in FIG. 3.

When the base station determines that pilots of another PUSCH are also transmitted in the pilot transmission symbol in a multiplexing mode, for example, another PUSCH is transmitted in the last four symbols, then the base station will further determine that data of the PUSCH 1 are not transmitted over the resources in the pilot transmission symbol, and indicate it in the second indication field, via "00", in the UL grant 1 as illustrated in FIG. 5-2. Alike, at this time, the base station transmits a UL grant 2 to schedule the terminal A or B to transmit a PUSCH 2 in the last four symbols in RBs 0 and 1, where the first indication field in the UL grant 2 indicates "1", that is, pilots of the PUSCH 2 are mapped in a comb pattern starting with the second frequency-domain start position in the pilot transmission symbol, and the second indication field in the UL grant 2 indicates "00", that is, data of the PUSCH 2 are not transmitted over the resources in the pilot transmission symbol. In another implementation, the base station can determine for each RB or each sub-band scheduled for the PUSCH 1 whether data can be transmitted in the pilot transmission symbol in the RB or the sub-band, and as illustrated in FIG. 5-4, for example, if the pilots of the PUSCH 2 and the PUSCH 1 are only transmitted in the RB 1 in a multiplexing mode, and the pilots of the other PUSCH are not transmitted in the pilot transmission symbol in the RB 2 occupied by the PUSCH 1 in a multiplexing mode, so data of the PUSCH 1 may be transmitted over an idle resource in the pilot transmission symbol in the RB 2, and at this time, the second indication field in the UL grant shall be extended in such a way that there is indication information corresponding to each RB or each sub-band to indicate whether data can be transmitted over a resource in the pilot transmission symbol in the RB or the sub-band, and if so, to indicate a frequency-domain start position of the available resource.

Third Implementation: the base station transmits a UL grant 1 to schedule the terminal A to transmit a PUSCH 1 in seven symbols in RBs 1 and 2, where a first indication field in the UL grant 1 indicates "0", that is, the terminal A transmits pilots starting with a first frequency-domain start position; and for example, a terminal B transmits in the uplink using a DFT-S-OFDM waveform, and the base station transmits a UL grant 2 to schedule the terminal B to transmit a PUSCH 2 in seven symbols in the RBs 1 and 2, that is, the terminal A and the terminal B transmit over the same resource in an MU-MIMO mode, where the first indication field in the UL grant 2 indicates "0", that is, the terminal B transmits pilots starting with the first frequency-domain start position. At this time, the pilots of the terminal A and the terminal B are transmitted over the same resource, and they are transmitted in even REs in the RBs 1 and 2 starting with the first frequency-domain start position, so different cyclic shifts and/or orthogonal sequences thereof (there may be only different cyclic shifts or only different orthogonal sequences or both) shall be applied to ensure that the pilots of the terminal A and the terminal B are orthogonal to each other, so that a receiver can parse the pilots over the same resource correctly for the pilots of the terminal A and the terminal B; and cyclic shift values and/or orthogonal sequences for generating the pilots can be predefined, or can be configured via higher-layer signaling, or can be notified to the terminals A and B in third indication fields in the UL grants.

Figures 5, 6:
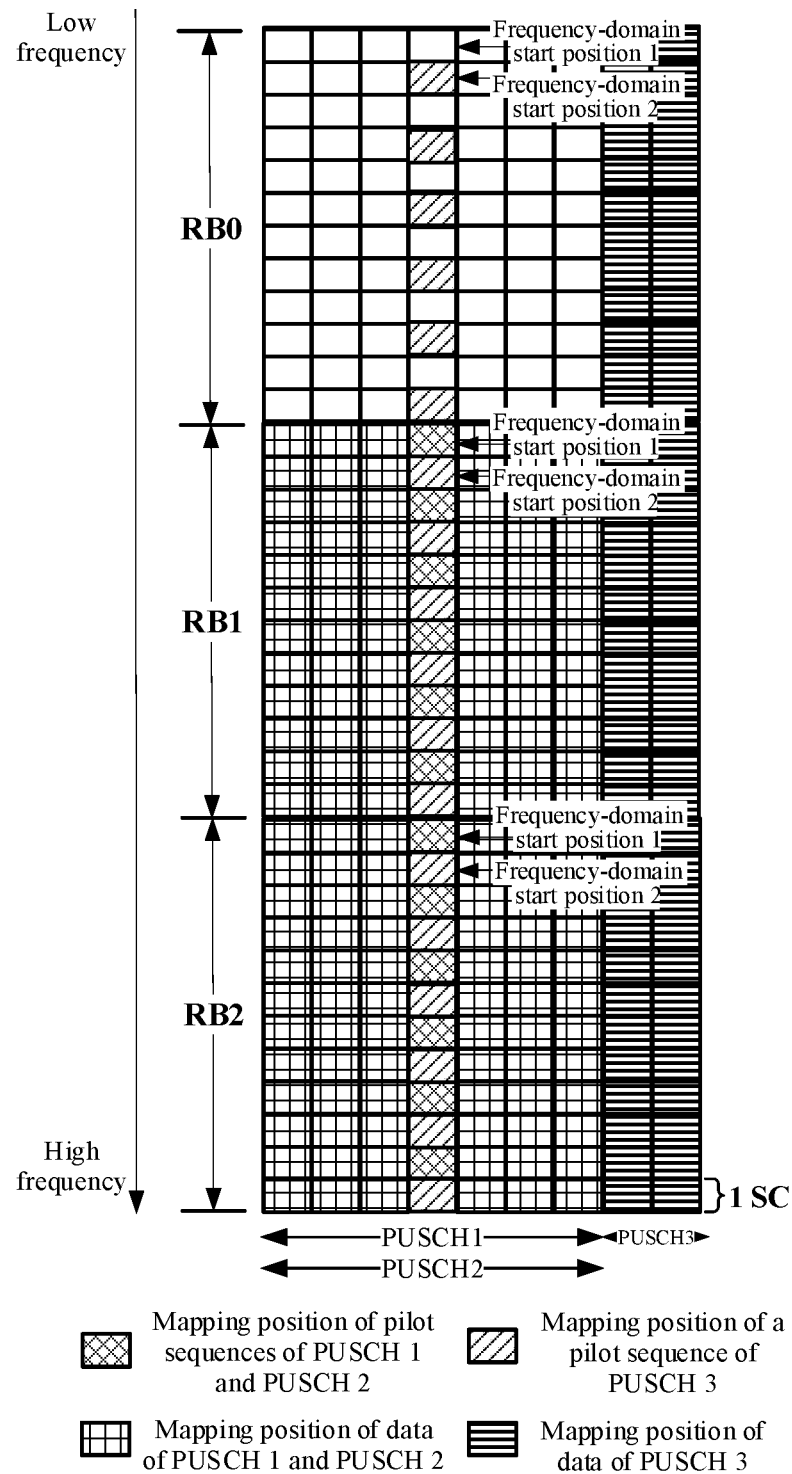

At this time, it can be defined directly that or the second indication fields in the UL grants can indicate that a resource corresponding to the second frequency-domain start position in the pilot transmission symbol are not used for transmitting data of the terminals A and B, as illustrated in FIG. 5-5; if pilots of still another PUSCH 3 are to be transmitted together with the pilots of the PUSCH 1 and the PUSCH 2 in the fourth symbol among sequent symbols in a multiplexing mode, then the second frequency-domain start position may be indicated to the PUSCH 3 in a UL grant 3 for scheduling the PUSCH 3, for transmitting the pilots of the PUSCH 3 as illustrated in FIG. 5-6; and if the resources of the PUSCH 3 overlap with the resources of the PUSCH 1 and the PUSCH 2 in only a part of the RBs, then for all the RBs of the PUSCH 1 and the PUSCH 2, it may be defined, or the second indication field in the UL grant may indicate, as described above, that data are not transmitted in the pilot transmission symbol, and for the PUSCH 1 using CP-OFDM, it can be also indicated for each RB or each sub-band that data can be transmitted in the pilot transmission symbol in the RB or the sub-band.

Figures 5, 6, 7:
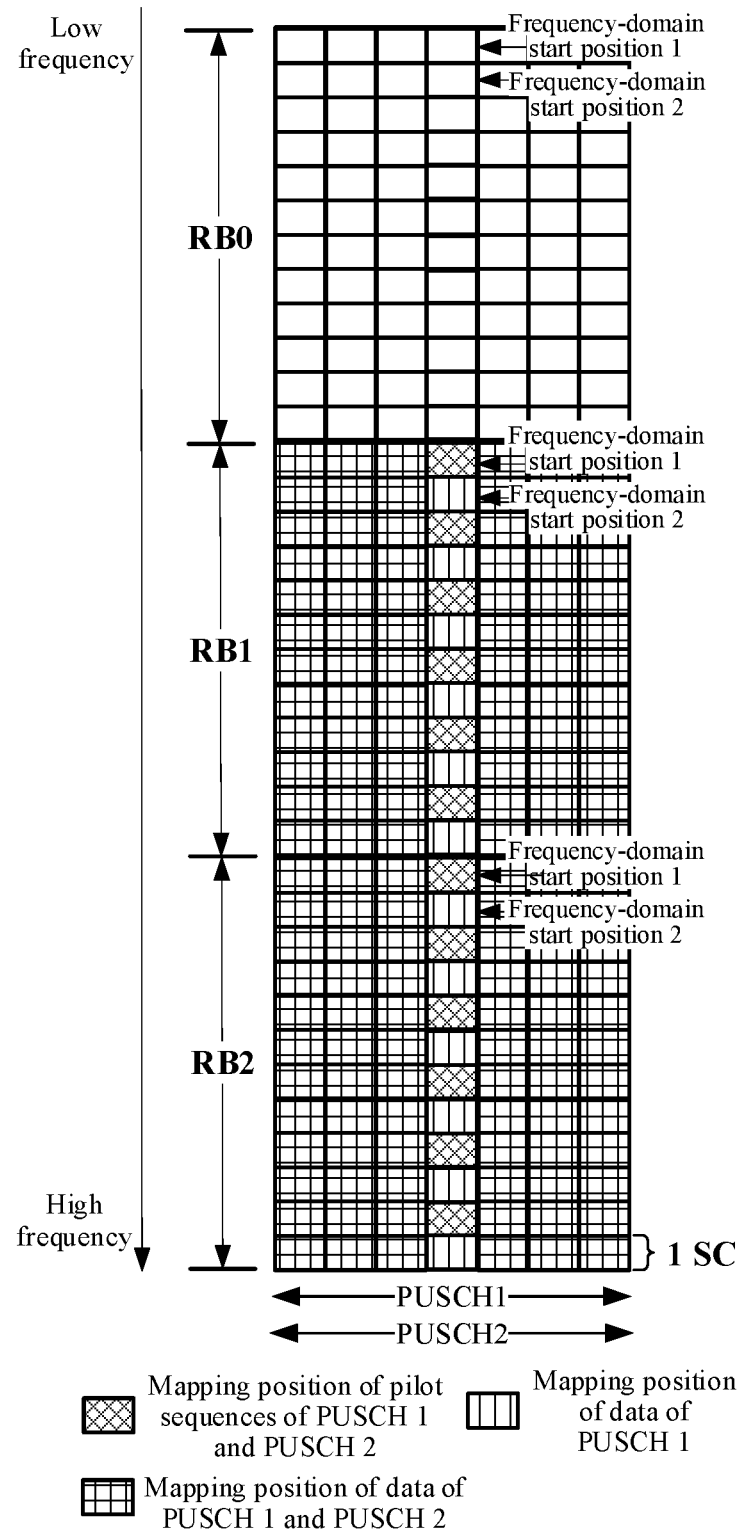

Alternatively, for the terminal using CP-OFDM (the terminal A), it can be defined directly that or the second indication field in the UL grant can indicate that data of the terminal A can be transmitted over a resource corresponding to the second frequency-domain start position, in the pilot transmission symbol; and at this time, for the terminal using DFT-S-OFDM (the terminal B), it can be always defined that or the second indication field in the UL grant can indicate that data cannot be transmitted over the resource corresponding to the second frequency-domain start position in the pilot transmission symbol to maintain a single-carrier characteristic of a DFT-S-OFDM waveform (so as to lower a Peak to Average Power Ratio (PAPR)/CM), where if this is defined, then the UL grant may not include the second indication field, as illustrated in FIG. 5-7.

Fourth Implementation: the base station transmits a UL grant 1 to schedule the terminal A to transmit a PUSCH 1 in seven symbols in RBs 1 and 2, where a first indication field in the UL grant 1 indicates "0", that is, the terminal A transmits pilots starting with a first frequency-domain start position; and for example, a terminal B transmits in the uplink using a DFT-S-OFDM waveform, and the base station transmits a UL grant 2 to schedule the terminal B to transmit a PUSCH 2 in seven symbols in the RBs 1 and 2, that is, the terminal A and the terminal B transmit over the same resource in an MU-MIMO mode, where the first indication field in the UL grant 2 indicates "1", that is, the terminal B transmits pilots starting with a second frequency-domain start position. At this time, the transmission resources of the pilots of the terminal A and the terminal B are multiplexed in the same symbol in an FDM mode, and different cyclic shifts and/or different orthogonal sequences may not be applied (of course, they may alternatively be applied) because the pilots of the terminal A and the terminal B may be distinguished from each other in terms of their resources, as illustrated in FIG. 5-8; and in this case, if there is a larger comb interval, e.g., of a value of 3 or more than 3, then there may be still remaining frequency-domain start positions, and these frequency-domain start positions may be used for other PUSCHs for which pilots are transmitted in the fourth symbol in a multiplexing mode, or if the pilots of the other PUSCHs are not transmitted over the resources corresponding to these frequency-domain start positions, then the resources corresponding to these frequency-domain start positions can be indicated to the terminal A for transmitting data.

At the terminal side: upon reception of the UL grant 1, the terminal A determines transmission resources of pilots, and transmission resources of data according to scheduling information and indication information in the UL grant 1, where the indication information indicates available frequency-domain start positions for pilots and data, and transmits pilots and data over the corresponding transmission resources particularly as in the first to third implementations at the base station side. For example, a frequency-domain start position of pilots is determined as a first frequency-domain start position, a comb interval is 2, and the number of RBs is 2, so a length of a pilot sequence is determined as 12/2*2=12, and a pilot sequence with the length of 12 is generated; and if a cyclic shift value and/or an orthogonal sequence is configured, then the pilot sequence will be generated according to the cyclic shift value and/or the orthogonal sequence, and then mapped onto even REs (REs 0, 2, 4, 6, 8, and 10) in each of two RBs scheduled in the fourth symbol. For example, it is determined not to transmit data over a resource in the pilot transmission symbol, so data can only be mapped onto the first to third symbols; and in another example, it is determined that data can be transmitted using a second frequency-domain start position in the pilot transmission symbol, so data can be mapped onto the first to third symbols, and odd REs (REs 1, 3, 5, 7, 9, and 11) in the fourth symbol, and the terminal A can determine the encoding and rate-matching of the data, according to available resources of the data, and map the rate-matched data onto the available resources of the data for transmission; and the other terminal can receive the UL grant and transmit, or the terminal A can receive the other UL grant and transmit, as described above, so a repeated description thereof will be omitted here.

At the base station side: the base station receives the PUSCH 1 transmitted by the terminal A, and pilot information of the PUSCH 1 over the corresponding resources according to the scheduling by the UL grant 1; and if another UL grant is further transmitted, then the base station will receive it in the same way.

In the second implementation above, the PUSCH 2 may be a CP-OFDM or DFT-S-OFDM waveform, and if the PUSCH 2 is a DFT-S-OFDM waveform, it is always defined that data are not mapped onto resources in the pilot transmission symbol due to a single-carrier characteristic, so the UL grant 2 may not include the second indication field, or when it includes the second indication field, the second indication field always indicates "00', for example. In an implementation, whether the UL grant includes the second indication field can depend upon a waveform for the UE in the uplink, and if the waveform is a DFT-S-OFDM waveform, then the UL grant will not include the second indication field; and if the waveform is a CP-OFDM waveform, then the UL grant will include the second indication field.

In the embodiment above, alternatively whether these resources in the pilot transmission symbol can be used for transmitting data can be indicated in one bit in the second indication field in the UL grant 2, and if these resources can be used for transmitting data, then a specific frequency-domain start position for transmitting data may be indicated otherwise (e.g., indicated implicitly, or it is predefined that data can be transmitted over all the other resources than resources for transmitting pilots, or data can be transmitted over a resource corresponding to a next frequency-domain start position adjacent to the pilots, etc.).

In the embodiment above, a terminal is configured with only one frequency-domain start position in a pilot transmission symbol, for example, but a terminal can alternatively be configured with more than one frequency-domain start position for transmitting pilots, in the pilot transmission symbol; and at this time, a plurality of pilot mapping resource groups can be determined according to the comb interval and each frequency-domain start position for the purpose of making full use of idle resources in the pilot transmission symbol so as to improve the performance of channel estimation by the terminal. At this time, pilots are mapped separately in each pilot mapping resource group, and pilot sequences in respective pilot mapping resource groups can be generated separately using different cyclic shifts and/or orthogonal sequences, or can be generated according to only one pilot mapping resource group, and duplicated and transmitted in another pilot mapping resource group, that is, the same sequences are transmitted in the different pilot mapping resource groups. Of course, pilot mapping resources determined according to a plurality of frequency-domain start positions can be defined as a set, and the terminal can generate a pilot sequence according to the size of the resource set. In the third implementation, for example, the terminal A can be configured to transmit pilots starting with the first frequency-domain start position and the second frequency-domain start position, and at this time, the first indication field in the UL grant may be extended to indicate a plurality of frequency-domain start positions, so a pilot sequence transmitted starting with the first frequency-domain start position shall be transmitted together with pilots of the terminal B in an MU-MIMO mode, and thus shall be separate from a pilot sequence transmitted starting with the second frequency-domain start position, that is, the terminal A can generate a pilot sequence with a length of 12, duplicates it into two copies, and transmit them respectively starting with the two frequency-domain start positions, or the terminal can generate two pilots sequences with the length of 12 separately, and transmit them respectively starting with the two frequency-domain start positions, as illustrated in FIG. 5-9. Of course, the terminal can alternatively generate a pilot sequence with a length of 24, and map it onto a set of frequency-domain resources including the two frequency-domain start positions in an order of descending frequencies.

In the embodiment above, the structure of a slot including seven symbols is described, and pilots are transmitted in the fourth symbol, for example, but pilots can alternatively be transmitted in another symbol, e.g., the first symbol, and pilots of a plurality of subsequent PUSCHs can be transmitted in the first symbol in a multiplexing mode as illustrated in FIG. 6, or pilots can be transmitted in a plurality of symbols similarly to the embodiment above; and given another slot structure or PUSCH transmission length (another number of symbols in the time domain), pilots can also be transmitted similarly to the embodiment above without departing from the scope of the invention, so a repeated description thereof will be omitted here.

In the embodiment above, the comb interval or the number of combs is 2, for example, and given another comb interval or number of combs as illustrated in FIG. 7, for example, pilots and data can be transmitted similarly to the embodiment above without departing from the scope of the invention, although the numbers of bits in the first indication field and the second indication field may be changed as needed, for example, to indicate that data of the terminal using CP-OFDM are transmitted starting with a spare frequency-domain start position, so a repeated description thereof will be omitted here.

Figures 5, 6, 7, 8:
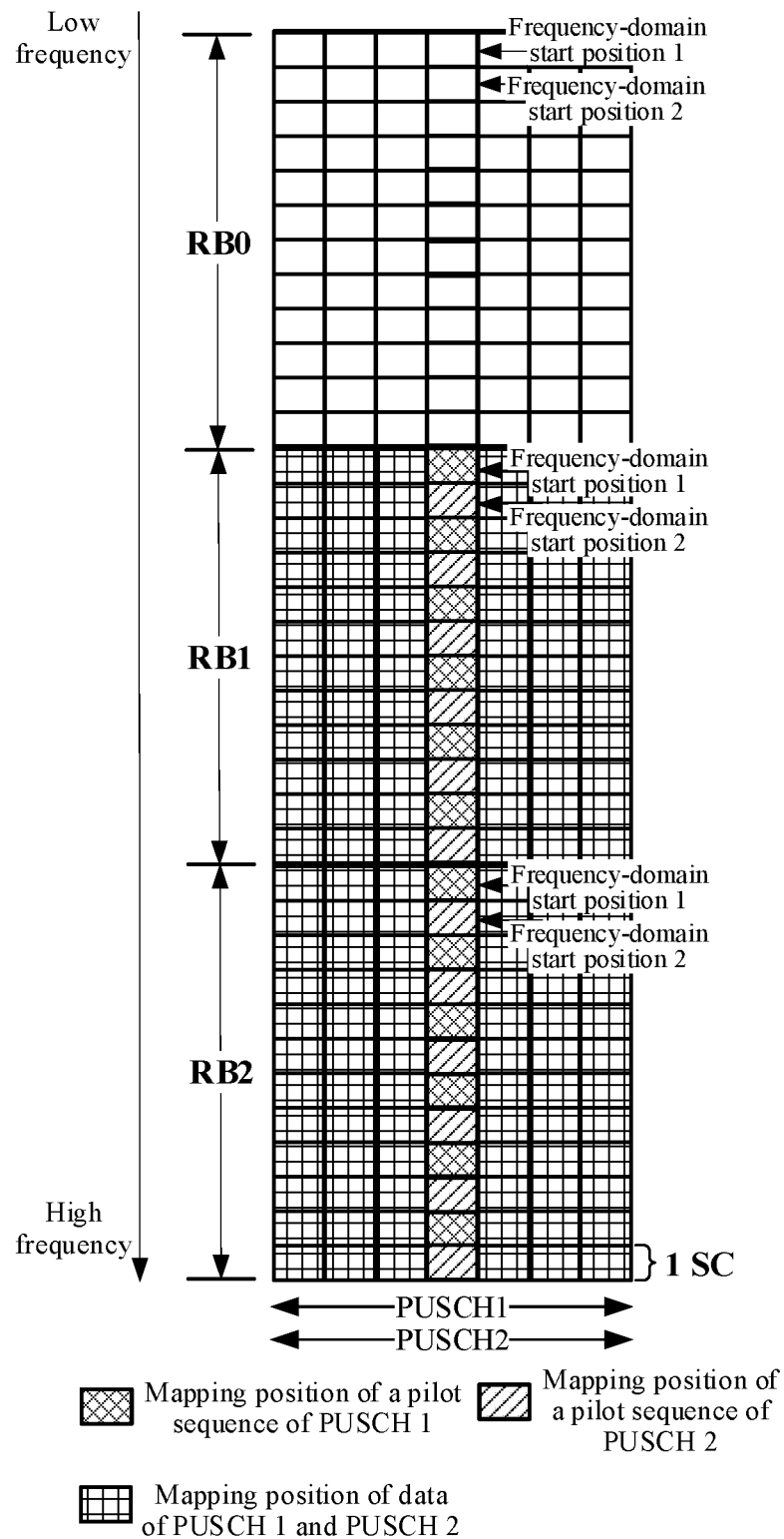

Based upon the same technical idea, an embodiment of the invention further provides a terminal as illustrated in FIG. 8, which includes: a determining unit 801 configured to determine a frequency-domain start position of pilots, where the terminal is a terminal using CP-OFDM for uplink transmission; a pilot mapping unit 802 configured to map the pilots onto a pilot transmission symbol, according to a comb interval and the determined frequency-domain start position; and a transmitting unit 803 configured to transmit the pilots mapped onto the pilot transmission symbol to a base station.

Optionally, the determining unit 801 is configured to: determine the frequency-domain start position of the pilots according to a pre-definition between the terminal and the base station; or determine the frequency-domain start position of the pilots according to configuration signaling transmitted by the base station.

Optionally, a candidate value of the frequency-domain start position is K, where K∈[0, N−1], K is an integer, N is the comb interval, and N is a positive integer.

Optionally, the pilot transmission symbol is one or more symbols predefined between the terminal and the base station; or the pilot transmission symbol is one or more symbols determined by the terminal according to configuration signaling transmitted by the base station.

Optionally, the determining unit 801 is further configured to obtain the pilots mapped onto the pilot transmission symbol by: determining a cyclic shift value and/or an orthogonal sequence of a pilot sequence; and generating the pilots according to the cyclic shift value and/or the orthogonal sequence.

Optionally, the determining unit 801 is configured to: determine the cyclic shift value and/or the orthogonal sequence according to a pre-definition between the terminal and the base station; or determine the cyclic shift value and/or the orthogonal sequence according to configuration signaling transmitted by the base station.

Optionally, there are a plurality of frequency-domain start positions, and the pilot mapping unit 802 is configured to map a plurality of pilot sequences respectively onto the pilot transmission symbol according to each frequency-domain start position and the comb interval.

Optionally, the terminal further includes a data mapping unit 804 configured to: decide not to transmit any data in the pilot transmission symbol; or determine a frequency-domain start position for transmitting data in the pilot transmission symbol, and mapping data onto the pilot transmission symbol according to the determined frequency-domain start position for transmitting data, and the comb interval.

Optionally, the data mapping unit 804 is configured to determine the frequency-domain start position for transmitting data, according to a pre-definition between the terminal and the base station; or to determine the frequency-domain start position for transmitting data, according to configuration signaling transmitted by the base station.

Optionally, the comb interval is predefined between the terminal and the base station; or the comb interval is obtained by the terminal according to configuration signaling transmitted by the base station.

Figures 5, 6, 7, 8, 9:
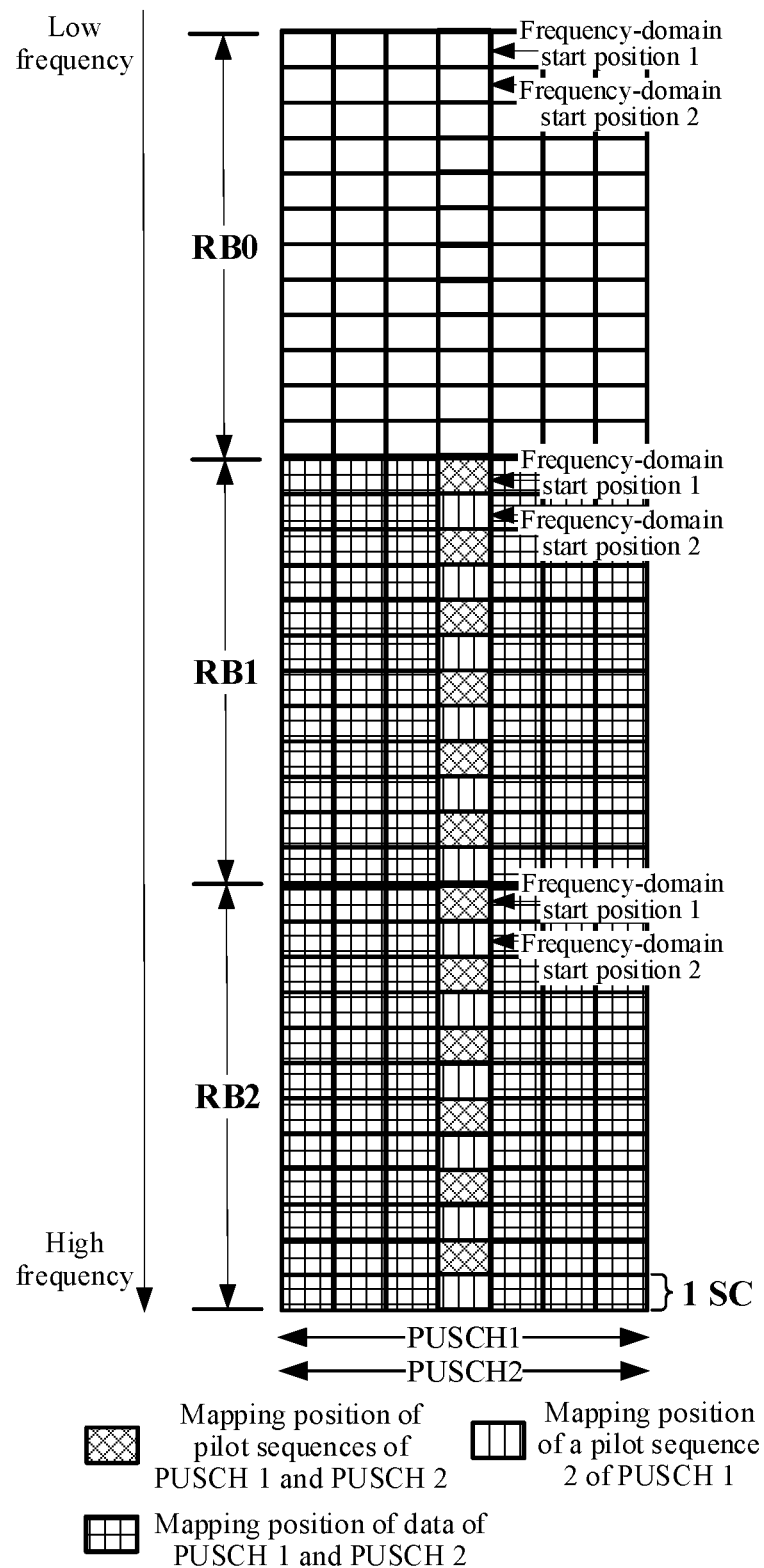
Figure 6:
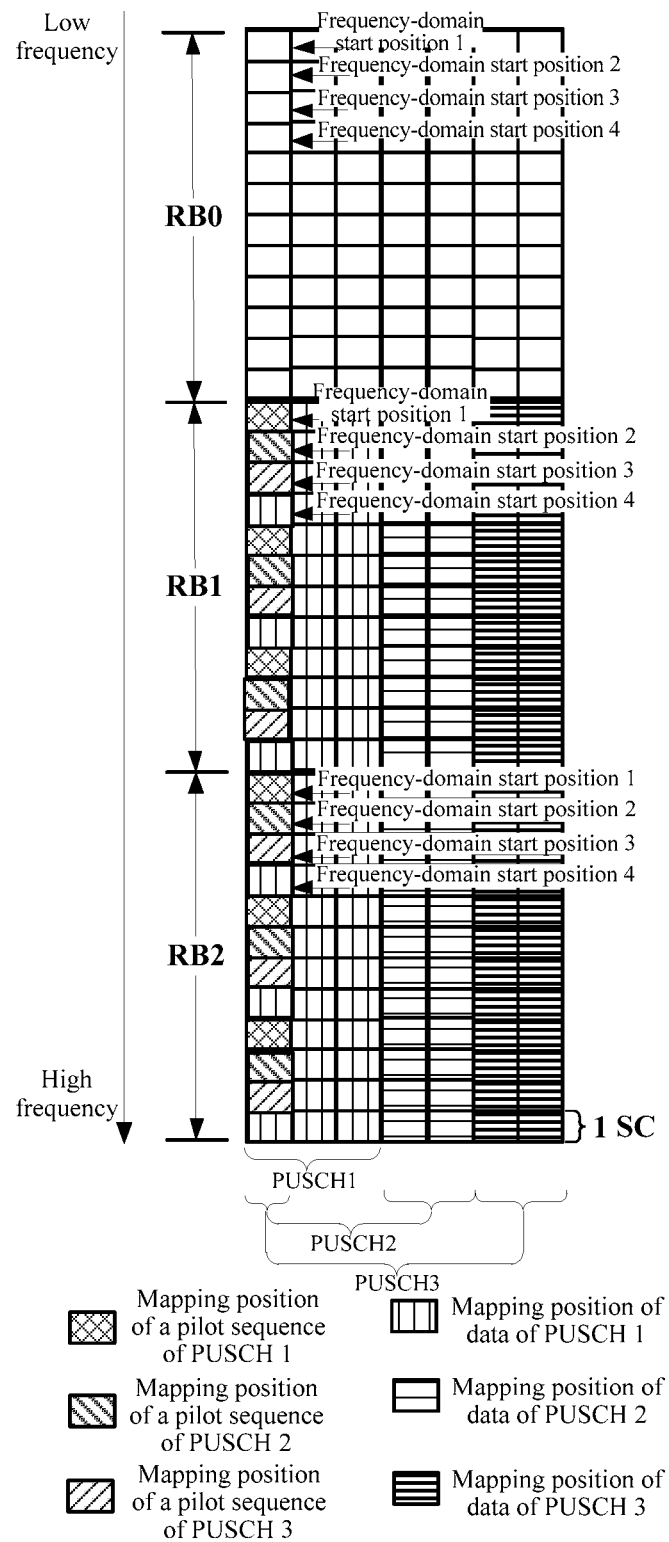
Figure 7:
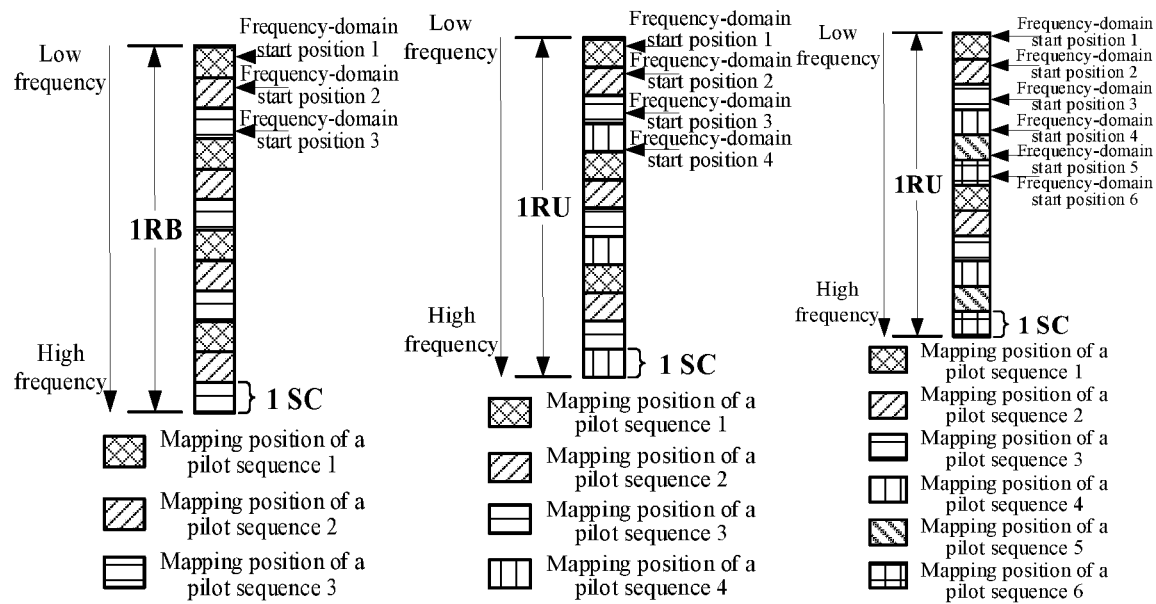
Figure 8:
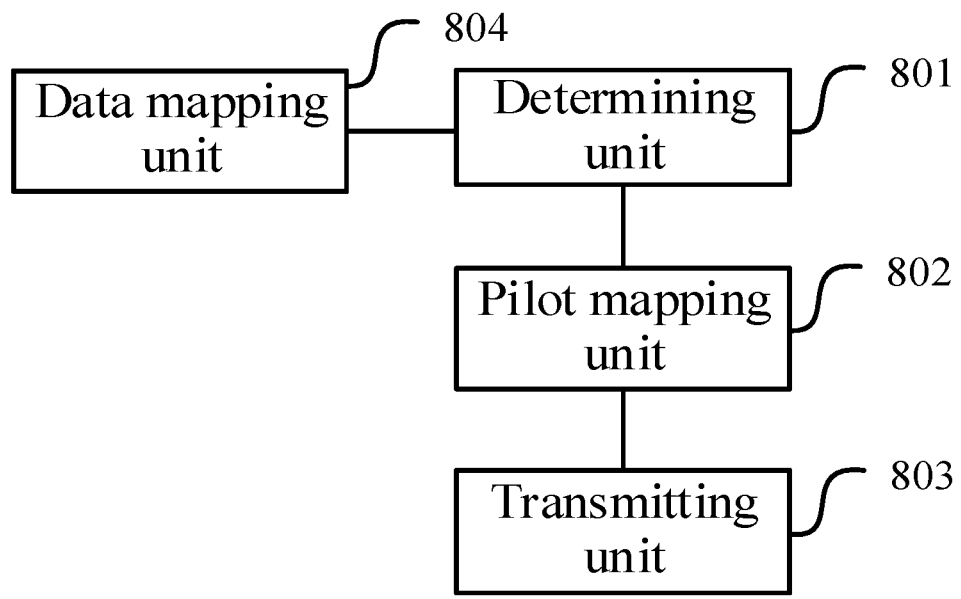
Figure 9:
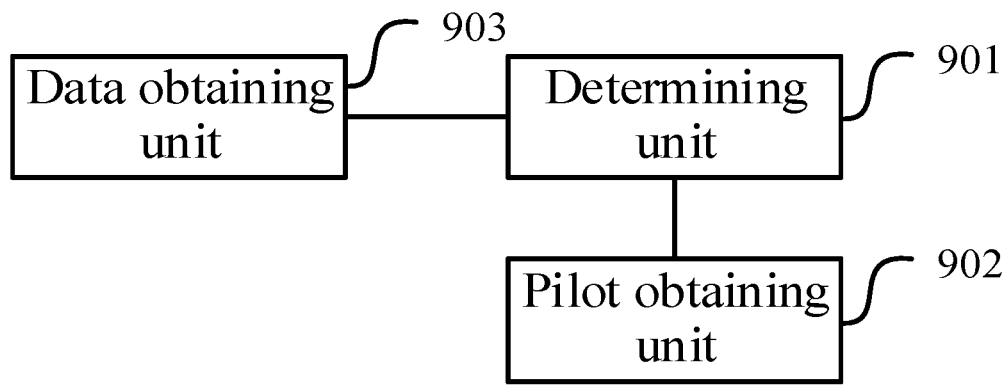

Based upon the same technical idea, an embodiment of the invention further provides a base station as illustrated in FIG. 9, where the base station includes: a determining unit 901 configured to determine a frequency-domain start position of pilots of a terminal, where the terminal is a terminal using CP-OFDM for uplink transmission; and a pilot obtaining unit 902 configured to obtain the pilots of the terminal in a pilot transmission symbol of the terminal according to a comb interval and the determined frequency-domain start position.

Optionally, the frequency-domain start position of the pilots is predefined between the terminal and the base station; or the frequency-domain start position of the pilots is predetermined by the base station, and transmitted to the terminal via configuration signaling.

Optionally, a candidate value of the frequency-domain start position is K, where K∈[0, N−1], K is an integer, N is the comb interval, and N is a positive integer.

Optionally, the pilot transmission symbol is one or more symbols predefined between the terminal and the base station, or the pilot transmission symbol is one or more symbols determined by the base station, and notified to the terminal via configuration signaling.

Optionally, the determining unit 901 is further configured to obtain the pilots mapped onto the pilot transmission symbol by: determining a cyclic shift value and/or an orthogonal sequence of a pilot sequence, and obtaining the pilots according to the cyclic shift value and/or the orthogonal sequence.

Optionally, the cyclic shift value and/or the orthogonal sequence are/is predefined between the terminal and the base station; or the cyclic shift value and/or the orthogonal sequence are/is determined by the base station, and notified to the terminal via configuration signaling.

Optionally, there are a plurality of frequency-domain start positions, and the pilot obtaining unit 902 is configured to obtain a plurality of pilot sequences respectively in the pilot transmission symbol according to each frequency-domain start position and the comb interval.

Optionally, the base station further includes a data obtaining unit 903 configured to: determine that there are not any data transmitted in the pilot transmission symbol; or determine a frequency-domain start position for transmitting data in the pilot transmission symbol, and obtain data in the pilot transmission symbol according to the determined frequency-domain start position for transmitting data, and the comb interval.

Optionally, the frequency-domain start position for transmitting data is predefined between the terminal and the base station; or the frequency-domain start position for transmitting data is determined by the base station, and transmitted to the terminal via configuration signaling.

Optionally, the comb interval is predefined between the terminal and the base station; or the comb interval is determined by the base station, and transmitted to the terminal via configuration signaling.

Figure 10:
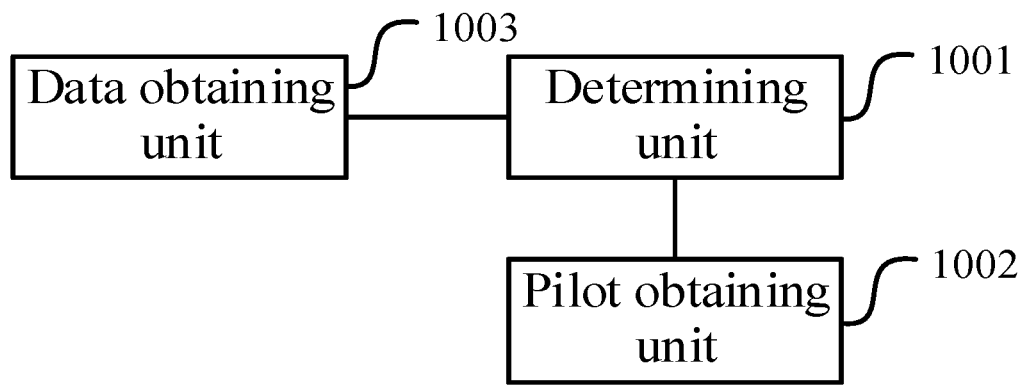
FIG. 10 is a schematic diagram of a second base station according to an embodiment of the invention.

Based upon the same technical idea, an embodiment of the invention further provides a base station as illustrated in FIG. 10, where the base station includes: a determining unit 1001 configured to determine a frequency-domain start position of pilots of each of a plurality of terminals, where at least one of the plurality of terminals is a terminal using CP-OFDM for uplink transmission, at least one of the plurality of terminals is a terminal using DFT-S-OFDM for uplink transmission, and uplink transmission resources of the plurality of terminals are overlapped in the frequency domain; and a pilot obtaining unit 1002 configured to obtain the pilots of each terminal in a pilot transmission symbol of each terminal according to a comb interval and each determined frequency-domain start position.

Optionally, the frequency-domain start position of the pilots of each terminal is predefined between the base station and each terminal; or the frequency-domain start position of the pilots of each terminal is predetermined by the base station, and transmitted to each terminal via configuration signaling.

Optionally, a candidate value of the frequency-domain start position of each terminal is K, where K∈[0, N−1], K is an integer, N is the comb interval, and N is a positive integer.

Optionally, the pilot transmission symbol is one or more symbols predefined between the base station and each terminal; or the pilot transmission symbol is one or more symbols determined by the base station, and notified to each terminal via configuration signaling.

Optionally, the determining unit 1001 is further configured to obtain the pilots mapped onto the pilot transmission symbol of each terminal by: determining a cyclic shift value and/or an orthogonal sequence of a pilot sequence of each terminal; and obtaining the pilots of each terminal according to the cyclic shift value and/or the orthogonal sequence of each terminal.

Optionally, the cyclic shift value and/or the orthogonal sequence of each terminal are/is predefined between the base station and each terminal; or the cyclic shift value and/or the orthogonal sequence of each terminal are/is determined by the base station, and notified to each terminal via configuration signaling.

Optionally, there are a plurality of frequency-domain start positions, and the pilot obtaining unit 1002 is configured to obtain, for any one of the terminals, a plurality of pilot sequences of the terminal respectively in the pilot transmission symbol of the terminal according to each frequency-domain start position of the terminal, and the comb interval.

Optionally, the base station further includes a data obtaining unit 1003 configured to: determine, for any one of the terminals, that there are not any data transmitted in the pilot transmission symbol of the terminal, or determine a frequency-domain start position for transmitting data in the pilot transmission symbol of the terminal, and obtain data in the pilot transmission symbol of the terminal according to the determined frequency-domain start position for transmitting data, and the comb interval.

Optionally, the frequency-domain start position for transmitting data is predefined between the terminal and the base station, or the frequency-domain start position for transmitting data is determined by the base station, and transmitted to the terminal via configuration signaling.

Optionally, the comb interval is predefined between each terminal and the base station, or the comb interval is determined by the base station, and transmitted to each terminal via configuration signaling.

Figure 11:
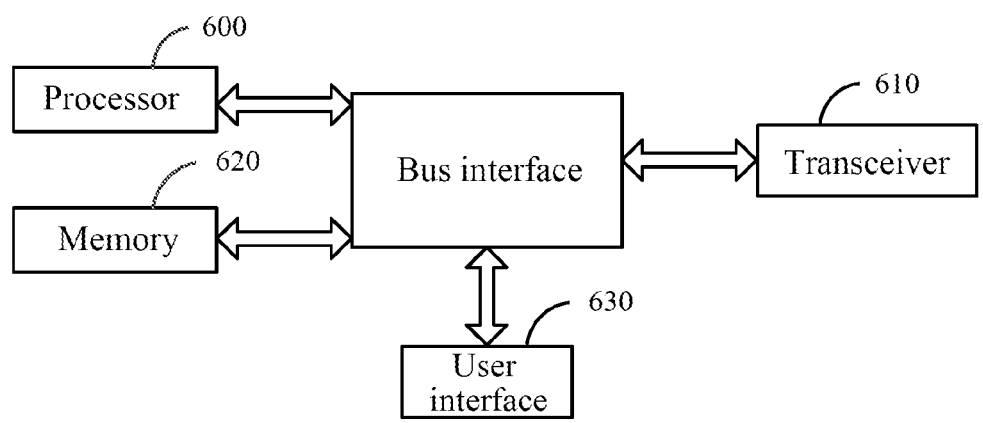
FIG. 11 is a schematic diagram of another terminal according to an embodiment of the invention.

As illustrated in FIG. 11, an embodiment of the invention provides another terminal including a memory 620 configured to store program instructions; and a processor 600 configured to read and execute program instructions in the memory 620 to: determine a frequency-domain start position of pilots, where the terminal is a terminal using CP-OFDM for uplink transmission, map the pilots onto a pilot transmission symbol, according to a comb interval and the determined frequency-domain start position, and transmit the pilots mapped onto the symbol to a base station through a transceiver 610; and the transceiver 610 is configured to receive and transmit data under the control of the processor 600.

Moreover, the processor 600 also has a function of invoking the program instructions stored in the memory 620 to perform the uplink transmission method according to any one of the solutions according to the embodiment above of the invention, and reference can be made to the description of the embodiment above for details of the terminal, so a repeated description thereof will be omitted here.

Here in FIG. 11, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. For different user equipment, the user interface 630 can also be an interface via which devices are connected internally and externally as needed, and the connected devices include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

Optionally, the processor 600 can be a Central Processing Unit (CPU), an Application-Specific Integrated Circuit (ASIC), a Field-Programmable Gate Array (FPGA), or a Complex Programmable Logic Device (CPLD).

Figure 12:
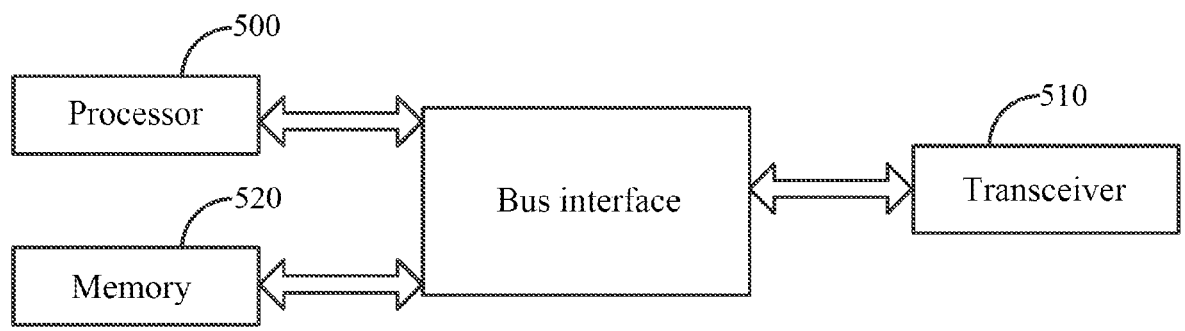
FIG. 12 is a schematic diagram of a third base station according to an embodiment of the invention.

As illustrated in FIG. 12, an embodiment of the invention provides another base station including a memory 520 configured to store program instructions; and a processor 500 configured to read and execute program instructions in the memory 520 to: determine a frequency-domain start position of pilots of a terminal, where the terminal is a terminal using CP-OFDM for uplink transmission, and obtain the pilots of the terminal in a pilot transmission symbol of the terminal according to a comb interval and the determined frequency-domain start position; and the transceiver 510 is configured to receive and transmit data under the control of the processor 500.

Moreover, the processor 500 also has a function of invoking the program instructions stored in the memory 520 to perform the uplink transmission method according to any one of the solutions according to the embodiment above of the invention, and reference can be made to the description of the embodiment above for details of the base station, so a repeated description thereof will be omitted here.

Here in FIG. 12, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. The processor 500 is responsible for managing the bus architecture and performing normal processes, and the memory 520 can store data for use by the processor 500 in performing the operations.

Optionally, the processor 500 can be a Central Processing Unit (CPU), an Application-Specific Integrated Circuit (ASIC), a Field-Programmable Gate Array (FPGA), or a Complex Programmable Logic Device (CPLD).

Figure 13:
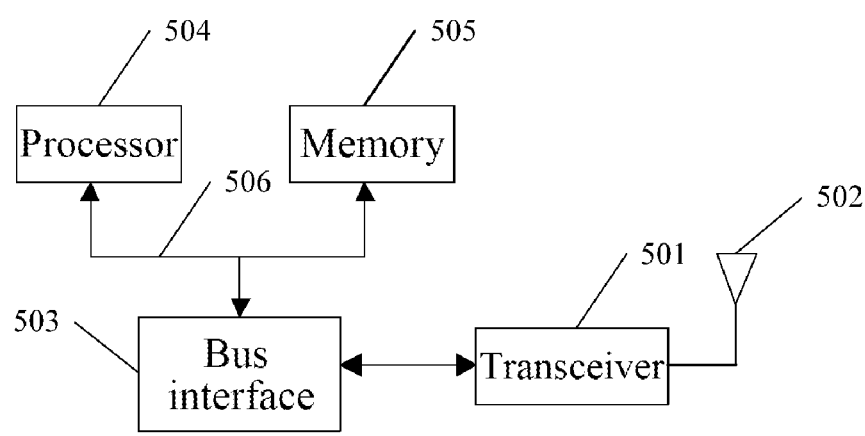
FIG. 13 is a schematic diagram of a fourth base station according to an embodiment of the invention.

As illustrated in FIG. 13, an embodiment of the invention provides another base station including a memory 505 configured to store program instructions; and a processor 504 configured to read and execute program instructions in the memory 505 to: determine a frequency-domain start position of pilots of each of a plurality of terminals, where at least one of the plurality of terminals is a terminal using CP-OFDM for uplink transmission, at least one of the plurality of terminals is a terminal using DFT-S-OFDM for uplink transmission, and uplink transmission resources of the plurality of terminals are overlapped in the frequency domain; and obtain the pilots of each terminal in a pilot transmission symbol of each terminal via a transceiver 501 according to a comb interval and each determined frequency-domain start position.

The transceiver 501 is configured to receive and transmit data under the control of the processor 504.

Moreover, the processor 504 also has a function of invoking the program instructions stored in the memory 505 to perform the uplink transmission method according to any one of the solutions according to the embodiment above of the invention, and reference can be made to the description of the embodiment above for details of the base station, so a repeated description thereof will be omitted here.

Here in FIG. 13, the bus architecture (represented as the bus 506) can include any number of interconnecting buses and bridges to particularly link together various circuits including one or more processors represented by the processor 504, and one or more memories represented by the memory 505. The bus 506 can further link together various other circuits, e.g., a peripheral device, a manostat, a power management circuit, etc., all of which are well known in the art, so a further description thereof will be omitted in this context. The bus interface 503 serves as an interface between the bus 506 and the transceiver 501. The transceiver 501 can be an element, or a number of elements, e.g., a transmitter and a receiver, which are units for communication with various other devices over a transmission medium.

Data processed by the processor 504 are transmitted over a wireless medium through the antenna 502, and furthermore the antenna 502 further receives data and transfers the data to the processor 504.

The processor 504 is responsible for managing the bus 506 and performing normal processes, and can further provide various functions including timing, a peripheral interface, voltage regulation, power management, and other control functions, and the memory 505 can store data for use by the processor 504 in performing the operations.

Optionally, the processor 504 can be a Central Processing Unit (CPU), an Application-Specific Integrated Circuit (ASIC), a Field-Programmable Gate Array (FPGA), or a Complex Programmable Logic Device (CPLD).

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An uplink transmission method, comprising:
   determining, by a terminal, a frequency-domain start position of pilots, wherein the terminal is a terminal using Cyclic Prefix-Orthogonal Frequency Division Multiplexing (CP-OFDM) for uplink transmission;
   mapping, by the terminal, the pilots onto a pilot transmission symbol, according to a comb interval and the determined frequency-domain start position; and
   transmitting, by the terminal, the pilots mapped onto the pilot transmission symbol to the base station;
   wherein the method further comprises:
   determining, by the terminal, not to transmit any data in the pilot transmission symbol; or
   determining, by the terminal, a frequency-domain start position for transmitting data in the pilot transmission symbol, and mapping data onto the pilot transmission symbol according to the determined frequency-domain start position for transmitting data, and the comb interval.

2. The method according to claim 1, wherein a candidate value of the frequency-domain start position is K, wherein $K \in [0, N-1]$, K is an integer, N is the comb interval, and N is a positive integer; and/or,
   the pilot transmission symbol is one or more symbols predefined between the terminal and the base station, or the pilot transmission symbol is one or more symbols determined by the terminal according to configuration signaling transmitted by the base station; and/or,
   the comb interval is predefined between the terminal and the base station, or the comb interval is obtained by the terminal according to configuration signaling transmitted by the base station.

3. The method according to claim 1, wherein obtaining, by the terminal, the pilots mapped onto the pilot transmission symbol, comprises:
   determining, by the terminal, a cyclic shift value and/or an orthogonal sequence of a pilot sequence according to a pre-definition between the terminal and the base station, or according to configuration signaling transmitted by the base station; and
   generating, by the terminal, the pilots according to the cyclic shift value and/or the orthogonal sequence; and/or,
   wherein there are a plurality of frequency-domain start positions, and mapping, by the terminal, the pilots onto the pilot transmission symbol, according to the comb interval and the determined frequency-domain start position comprises:
   mapping, by the terminal, a plurality of pilot sequences respectively onto the pilot transmission symbol according to each frequency-domain start position and the comb interval.

4. The method according to claim 1,
   wherein the determining, by the terminal, the frequency-domain start position for transmitting data in the pilot transmission symbol comprises:
   determining, by the terminal, the frequency-domain start position for transmitting data, according to a pre-definition between the terminal and the base station; or
   determining, by the terminal, the frequency-domain start position for transmitting data, according to configuration signaling transmitted by the base station.

5. The method according to claim 1, wherein determining, by the terminal, the frequency-domain start position of the pilots comprises:
   determining, by the terminal, the frequency-domain start position of the pilots according to a pre-definition between the terminal and the base station; or
   determining, by the terminal, the frequency-domain start position of the pilots according to configuration signaling transmitted by the base station.

6. An uplink transmission method, comprising:
   determining, by a base station, a frequency-domain start position of pilots of a terminal, wherein the terminal is a terminal using Cyclic Prefix-Orthogonal Frequency Division Multiplexing (CP-OFDM) for uplink transmission; and
   obtaining, by the base station, the pilots of the terminal in a pilot transmission symbol of the terminal according to a comb interval and the determined frequency-domain start position;
   wherein the method further comprises:
   determining, by the base station, that there are not any data transmitted in the pilot transmission symbol; or
   determining, by the base station, a frequency-domain start position for transmitting data in the pilot transmission symbol, and obtaining data in the pilot transmission symbol according to the determined frequency-domain start position for transmitting data, and the comb interval.

7. The method according to claim 6, wherein a candidate value of the frequency-domain start position is K, wherein $K \in [0, N-1]$, K is an integer, N is the comb interval, and N is a positive integer; and/or,
   the pilot transmission symbol is one or more symbols predefined between the base station and the terminal, or the pilot transmission symbol is one or more symbols determined by the base station, and notified to the terminal via configuration signaling; and/or,
   the comb interval is predefined between the base station and the terminal, or the comb interval is determined by the base station, and transmitted to the terminal via configuration signaling.

8. The method according to claim 6, wherein obtaining, by the base station, the pilots mapped onto the pilot transmission symbol, comprises:
   determining, by the base station, a cyclic shift value and/or an orthogonal sequence of a pilot sequence; wherein the cyclic shift value and/or the orthogonal sequence are/is predefined between the base station and the terminal, or the cyclic shift value and/or the orthogonal sequence are/is determined by the base station, and notified to the terminal via configuration signaling; and
   obtaining, by the base station, the pilots according to the cyclic shift value and/or the orthogonal sequence; and/or,
   wherein there are a plurality of frequency-domain start positions, and obtaining, by the base station, the pilots of the terminal in the pilot transmission symbol of the terminal according to the comb interval and the determined frequency-domain start position comprises:
   obtaining, by the base station, a plurality of pilot sequences respectively in the pilot transmission symbol according to each frequency-domain start position and the comb interval.

9. The method according to claim 6,
wherein the frequency-domain start position for transmitting data is predefined between the base station and the terminal; or the frequency-domain start position for transmitting data is determined by the base station, and transmitted to the terminal via configuration signaling.

10. The method according to claim 6, wherein the frequency-domain start position of the pilots is predefined between the base station and the terminal; or
the frequency-domain start position of the pilots is predetermined by the base station, and transmitted to the terminal via configuration signaling.

11. A terminal, comprising:
a memory configured to store program instructions; and
a processor configured to invoke the program instructions in the memory to:
determine a frequency-domain start position of pilots, wherein the terminal is a terminal using Cyclic Prefix-Orthogonal Frequency Division Multiplexing (CP-OFDM) for uplink transmission;
map the pilots onto a pilot transmission symbol, according to a comb interval and the determined frequency-domain start position; and
transmit the pilots mapped onto the pilot transmission symbol to the base station;
wherein the processor is further configured to invoke the program instructions in the memory to:
determine not to transmit any data in the pilot transmission symbol; or
determine a frequency-domain start position for transmitting data in the pilot transmission symbol; and map data onto the pilot transmission symbol according to the determined frequency-domain start position for transmitting data, and the comb interval.

12. The terminal according to claim 11, wherein a candidate value of the frequency-domain start position is K, wherein K∈[0, N−1], K is an integer, N is the comb interval, and N is a positive integer; and/or,
the pilot transmission symbol is one or more symbols predefined between the terminal and the base station, or the pilot transmission symbol is one or more symbols determined by the terminal according to configuration signaling transmitted by the base station; and/or,
the comb interval is predefined between the terminal and the base station, or the comb interval is obtained by the terminal according to configuration signaling transmitted by the base station.

13. The terminal according to claim 11, wherein the processor is further configured to invoke the program instructions in the memory to:
determine a cyclic shift value and/or an orthogonal sequence of a pilot sequence according to a pre-definition between the terminal and the base station, or according to configuration signaling transmitted by the base station; and
generate the pilots according to the cyclic shift value and/or the orthogonal sequence;
and/or,
wherein there are a plurality of frequency-domain start positions, and the processor is further configured to invoke the program instructions in the memory to:
map a plurality of pilot sequences respectively onto the pilot transmission symbol according to each frequency-domain start position and the comb interval.

14. The terminal according to claim 11,
wherein the frequency-domain start position for transmitting data is determined by the terminal according to a pre-definition between the terminal and the base station, or according to configuration signaling transmitted by the base station.

15. The terminal according to claim 11, wherein the processor is further configured to invoke the program instructions in the memory to:
determine the frequency-domain start position of the pilots according to a pre-definition between the terminal and the base station; or
determine the frequency-domain start position of the pilots according to configuration signaling transmitted by the base station.

16. A base station, comprising:
a memory configured to store program instructions; and
a processor configured to invoke the program instructions in the memory to:
determine a frequency-domain start position of pilots of a terminal, wherein the terminal is a terminal using Cyclic Prefix-Orthogonal Frequency Division Multiplexing (CP-OFDM) for uplink transmission; and
obtain the pilots of the terminal in a pilot transmission symbol of the terminal according to a comb interval and the determined frequency-domain start position;
wherein the processor is further configured to invoke the program instructions in the memory to:
determine that there are not any data transmitted in the pilot transmission symbol; or
determine a frequency-domain start position for transmitting data in the pilot transmission symbol, and obtain data in the pilot transmission symbol according to the determined frequency-domain start position for transmitting data, and the comb interval.

17. The base station according to claim 16, wherein a candidate value of the frequency-domain start position is K, wherein K∈[0, N−1], K is an integer, N is the comb interval, and N is a positive integer; and/or,
the pilot transmission symbol is one or more symbols predefined between the base station and the terminal, or the pilot transmission symbol is one or more symbols determined by the base station, and notified to the terminal via configuration signaling; and/or,
the comb interval is predefined between the base station and the terminal, or the comb interval is determined by the base station, and transmitted to the terminal via configuration signaling.

18. The base station according to claim 16, wherein the processor is further configured to invoke the program instructions in the memory to:
determine a cyclic shift value and/or an orthogonal sequence of a pilot sequence; wherein the cyclic shift value and/or the orthogonal sequence are/is predefined between the base station and the terminal, or the cyclic shift value and/or the orthogonal sequence are/is determined by the base station, and notified to the terminal via configuration signaling; and obtain the pilots according to the cyclic shift value and/or the orthogonal sequence;
and/or,
wherein there are a plurality of frequency-domain start positions, and the processor is further configured to invoke the program instructions in the memory to:
obtain a plurality of pilot sequences respectively in the pilot transmission symbol according to each frequency-domain start position and the comb interval.

19. The base station according to claim 16,
wherein the frequency-domain start position for transmitting data is predefined between the base station and the terminal; or the frequency-domain start position for transmitting data is determined by the base station, and transmitted to the terminal via configuration signaling.

20. The base station according to claim 16, wherein the frequency-domain start position of the pilots is predefined between the terminal and the base station; or the frequency-domain start position of the pilots is predetermined by the base station, and transmitted to the terminal via configuration signaling.

* * * * *